United States Patent
Gazit

(10) Patent No.: US 9,566,885 B2
(45) Date of Patent: Feb. 14, 2017

(54) HEAD RESTRAINT

(71) Applicant: Ben Cohen Gazit, Tel Aviv (IL)

(72) Inventor: Ben Cohen Gazit, Tel Aviv (IL)

(*) Notice: Subject to any disclaimer, the term of this patent is extended or adjusted under 35 U.S.C. 154(b) by 0 days.

(21) Appl. No.: 14/847,976

(22) Filed: Sep. 8, 2015

(65) Prior Publication Data

US 2016/0068086 A1 Mar. 10, 2016

Related U.S. Application Data

(60) Provisional application No. 62/047,739, filed on Sep. 9, 2014, provisional application No. 62/069,466, filed on Oct. 28, 2014.

(51) Int. Cl.
*A47C 7/38* (2006.01)
*B60N 2/48* (2006.01)

(52) U.S. Cl.
CPC ........... *B60N 2/4882* (2013.01); *B60N 2/4879* (2013.01)

(58) Field of Classification Search
CPC ............................ B60N 2/4879; B60N 2/4882
USPC .................................. 297/393, 397, 487, 488
See application file for complete search history.

(56) References Cited

U.S. PATENT DOCUMENTS

| | | |
|---|---|---|
| 2,267,103 A | 12/1941 | Ireland |
| 2,613,731 A | 10/1952 | Roginski |
| 2,638,293 A | 5/1953 | Lindstrom |
| 2,726,714 A | 12/1955 | McAndrews |
| 3,170,659 A | 2/1965 | Wood, Jr. |
| 3,376,064 A | 4/1968 | Jackson |
| 4,339,151 A | 7/1982 | Riggs |
| 4,707,031 A | 11/1987 | Meistrell |
| 5,443,303 A | 8/1995 | Bauer et al. |
| 5,505,523 A | 4/1996 | Wang |
| D395,781 S | 7/1998 | Golder |
| 6,266,825 B1 | 7/2001 | Floyd |
| 6,301,716 B1 | 10/2001 | Ross |
| 6,601,804 B2* | 8/2003 | Bisch ..................... A47C 7/383 297/397 X |
| 6,607,245 B1 | 8/2003 | Scher |
| 7,530,634 B1 | 5/2009 | Mortazavi et al. |
| D614,901 S | 5/2010 | Welch |
| 7,740,318 B2 | 6/2010 | Funke, III et al. |

(Continued)

FOREIGN PATENT DOCUMENTS

| | | |
|---|---|---|
| GB | 2179852 A | 3/1987 |
| GB | 2417896 A | 3/2006 |

(Continued)

OTHER PUBLICATIONS

Indiegogo.com <https://www.indiegogo.com/projects/relax-ally-travel-restband-saves-your-trip#/> Obtained from the Internet Mar. 29, 2016.

(Continued)

*Primary Examiner* — Rodney B White
(74) *Attorney, Agent, or Firm* — Roberts Mlotkowski Safran Cole & Calderon P.C.; Susanne M. Hopkins

(57) ABSTRACT

A head restraint including: a headrest member configured with a back portion and two side portions extending therefrom; a mounting arrangement articulated to the headrest member for mounting the head restraint to a seat; and a restraining member pivotally articulated to said side portions and configured for rotation at least between an upward position and a downward position.

16 Claims, 17 Drawing Sheets

(56) References Cited

U.S. PATENT DOCUMENTS

| | | | |
|---|---|---|---|
| 8,007,044 | B1 | 8/2011 | Dubey et al. |
| 8,287,045 | B1 | 10/2012 | Donohue et al. |
| 2001/0054837 | A1 | 12/2001 | O'Connor |
| 2002/0067063 | A1 | 6/2002 | Taborro |
| 2004/0095003 | A1 | 5/2004 | Dunk |
| 2004/0124685 | A1 | 7/2004 | Buch |
| 2005/0268381 | A1 | 12/2005 | Balensiefer et al. |
| 2006/0061186 | A1 | 3/2006 | Funke, III et al. |
| 2006/0244299 | A1 | 11/2006 | Snedeker |
| 2007/0186931 | A1 | 8/2007 | Zollinger et al. |
| 2007/0273194 | A1 | 11/2007 | Fraser |
| 2010/0102604 | A1 | 4/2010 | Barnes et al. |
| 2010/0225149 | A1 | 9/2010 | Noah |
| 2010/0281600 | A1 | 11/2010 | Tagg |
| 2010/0283310 | A1 | 11/2010 | Blackwood |
| 2011/0204696 | A1 | 8/2011 | Koehler |
| 2012/0119556 | A1 | 5/2012 | Maassarani |
| 2012/0299356 | A1* | 11/2012 | Edwards .............. B60N 2/4879 297/397 |
| 2013/0020853 | A1 | 1/2013 | Gibson |
| 2013/0031697 | A1 | 2/2013 | Woda |
| 2013/0146723 | A1* | 6/2013 | Johnson ................. A47D 15/00 248/118 |
| 2013/0300176 | A1 | 11/2013 | Gabriel |
| 2013/3300176 | | 11/2013 | Gabriel |
| 2015/0203009 | A1* | 7/2015 | Swearingen .......... B60R 22/001 297/392 |
| 2015/0257538 | A1* | 9/2015 | MacDougall .......... A47C 7/383 297/217.1 |
| 2015/0352988 | A1* | 12/2015 | Knapp ..................... A41D 1/00 297/393 |

FOREIGN PATENT DOCUMENTS

| | | |
|---|---|---|
| GB | 2415616 A | 4/2006 |
| GB | 2441497 A | 3/2008 |
| GB | 2459171 A | 10/2009 |
| KR | 20110129054 A | 12/2011 |
| WO | 0038946 A1 | 7/2000 |
| WO | 2014071828 A1 | 5/2014 |

OTHER PUBLICATIONS ben-bat.com <http://www.ben-bat.com/> Obtained from the Internet Mar. 29, 2016.

"PeeWee Gear Travel Pillows offer our Children Safety and Support when Travelling." mBm mumsbabymagazine.com, ⊂http://mumsbabymagazine.com/mbm/archives/1016> Obtained from the Internet Mar. 29, 2016.

"SlumberSling" Ash & Alys babes ashandalysbabes.com,<http://www.ashandalysbabes.com/collections/slumbersling>Obtained from the Internet Mar. 29, 2016.

"Dad Invents a Travel Must Have: Unique Headrest for Kids to Comfortably Sleep in Cars " Parents Guide of Las Vegas parentsguidelv.com, <http://parentsguidelv.com/magazine/4104/dad-invents-a-travel-must-have-unique-headrest-for-kids-to-comfortably-sleep-in-cars> Obtained from the Internet Mar. 29, 2016.

"The Deeper Sleeper Pillow Headrest " Go Planet go goplanetgo.com, <http://www.goplanetgo.com/products/the-deeper-sleeper-travel-pillow-headrest> Obtained from the Internet Mar. 29, 2016.

"Kiddopotamus Cradler Adjustable Head Support for Newborns to Toddlers, Pink Bunnies (Discontinued by Manufacturer)" Amazon Department amazon.com, <http://www.amazon.com/Kiddopotamus-Cradler-Adjustable-Newborns-Toddlers/dp/B000HEBA0S> Obtained from the Internet Mar. 29, 2016.

"Summer Infant Cradler, Ivory (Discontinued by Manufacturer) (Discontinued by Manufacturer)" Amazon Department amazon.com, <http://www.amazon.com/Summer-Infant-77460-Cradler-Ivory/dp/B0038JDCYQ> Obtained from the Internet Mar. 29, 2016.

"Kiddopotamus Cradler Adjustable Head Support for Newborns to Toddlers, Ivory Teddy Bears (Discontinued by Manufacturer)" Amazon Department amazon.com, <http://www.amazon.com/Kiddopotamus-Cradler-Adjustable-Newborns-Toddlers/dp/B0007CQ6XG> Obtained from the Internet Mar. 29, 2016.

Mother's Hand Headrest Comfort with emotional touch of Mother's Hands mothersandheadrest.com, <http://www.mothershandheadrest.com/Pages/default.aspx> Obtained from the Internet Mar. 29, 2016.

International Search Report dated Dec. 23, 2015 in related Application No. PCT/IL2015/050909.

* cited by examiner

HEAD RESTRAINT

TECHNICAL FIELD

This presently disclosed subject matter relates to head restraints, and more particularly to head restraints for use in conjunction with a seat.

BACKGROUND

Head restraints are used in order to provide improved head and neck support to a user while seated in a seat, e.g., in case the user falls asleep or in case of an individual with physical disorders. A head restraint can be used for preventing the user's head from falling forward or tilting to the left or the right side. This provides comfortable and stable support of the user's head while sitting on the seat.

For example, during sleep, the muscles in the neck and back of the human body that normally support the head are relaxed. The result in that when human beings (such as, babies) are asleep in a car seat, their head will fall forward or "roll" to the left or right, placing strain on the user's neck and spine and causing discomfort that diminishes the quality of sleep that the child enjoys. While driving in and around city streets, the forces associated with vehicle acceleration, braking, and sharp turns, respectively, further magnify the harmful effects on the neck and spine caused by the child's head not being supported.

There are many head restraints for adults and children are known in the art. One example is disclosed in U.S. Pat. No. 7,740,318 that discloses a padded strap that is attached to both sides of a child car seat using two sets of hook and loop type fasteners, and alternatively, through use of two rotating discs. Additional example is disclosed in US 2013/0300176 that discloses a head restraint system including a support arm formed of a flexible material which is displaceable between a first position extending horizontally across a portion of a child's forehead and a second position disposed away from the child's forehead.

SUMMARY OF THE PRESENTLY DISCLOSED SUBJECT MATTER

According to a first aspect of the presently disclosed subject matter, there is provided a head restraint comprising:

a headrest member configured with a back portion and two side portions extending therefrom;

a mounting arrangement articulated to the headrest member for mounting the head restraint to a seat; and a restraining member pivotally articulated to said side portions and configured for rotation at least between an upward position and a downward position.

The head restraint is configured for providing improved head and neck support to a user while seated in a seat, e.g., in case the user falls asleep or in case of an individual with physical disorders. More particularly, the restraining member is configured for preventing the user's head from falling forward, and the headrest member is configured for preventing the user's head from tilting to the left or the right side. This provides comfortable and stable support of the user's head while sitting on the seat. The head restraint can be mounted on any seat such as a seat of a vehicle, so as to provide increased head and neck stability to a user upon turning, braking or collision of the vehicle.

In use, when the user's head is positioned at the head restraint, the restraining member in its upward position can be located substantially above the use's head, and in its downward position the restraining member can be located substantially in front of the user's forehead.

The term 'user' as used herein in the specification and claims, denotes an individual, an infant, a child or an adult.

The term 'vehicle' as used herein in the specification and claims, denotes a wheel chair, an automobile, a bus, a train, a ship, an airplane, and the like.

The term 'seat' as used herein in the specification and claims refers to a booster seat, a highback booster, a safety seat, a stroller, a vehicle seat, a seat of a wheel chair, a chair, a bench, etc. The term 'seat' also refers to a portion of a seat, such as a seat headrest, or any other portion of any conventional seat.

The head restraint can be an add-on, i.e., it can be installed on various types of seats.

Any one or more of the following features, designs and configurations can be incorporated in the presently disclosed subject matter according to the first aspect, independently or in combination thereof:

The side portions of the headrest member can be foldable with respect to the back portion so as to allow the headrest member to assume a first state in which the side portions are spaced from each other at a first extent and a second state in which the side portions are spaced from each other to a second extent which is smaller than said first extent.

At the second state, the side portions can be disposed in proximity to the user's ears. This can be useful in reducing noise and thus improving the quality of the user's sleep.

Each of the side portions can be configured with an earphone, so that in the second state the earphones are disposed in proximity to the user's ears for providing sound thereto. The sound can be, for example, a relaxing music, a story, or parent's voice.

Displacement of the restraining member between its upward position and its downward position can be configured to cause the headrest member to assume its first and second states, respectively.

The back portion and the side portions can be integral and continuous or attachable to one another.

The back portion and the side portions can be formed as support cushions.

The back portion is configured to provide support to the back portion of the user's head, and the side portions are configured to provide support to the side portions of the user's head. The side portions can constitute a side impact protector for the user's head.

Rotation of the restraining member between the upward and downward positions can be performed by the user himself by one of his hands.

In the downward position, the restraining member can be spaced from the forehead of the user so that a gap extends between the forehead and the restraining member. This gap can provide an extra measure of comfort to the user, as there is no contact between the forehead and the restraining member. However, the gap should not be too great in order to allow the restraining member to effectively operate for delimiting forward movement of the head.

The restraining member can be configured with two side members and a central member disposed therebetween. One of the side members can be pivotally articulated to an exterior face of one side portion of the headrest member, and another one of the side members can be pivotally articulated to an exterior face of another one of the side portions of the headrest member. The pivotal connection can be provided by snap fasteners.

The central member of the restraining member can be formed as a strap.

Each of the side portions can be configured with a delimiting channel formed at its exterior face.

Each of the side members can be configured with a projecting portion configured to be received within its respective delimiting channel and displaced between two extreme ends thereof upon displacement of the restraining member between the upward and downward positions.

The side members and the delimiting channels can be made of a flexible, though hard plastic material. For example, the side members and the delimiting channels can be made of a polymer such as polypropylene.

The delimiting channels can have a shape of an arc, the length of which corresponds to the angle between the headrest member and the restraining member in its upward and downward positions.

The head restraint can be modular and can have the following two configurations:
 a frontal configuration in which the restraining member is pivotally mounted to the headrest member to be displaced between its upward and downward positions; and
 a rear configuration in which the restraining member is disposed at the rear side of the headrest member and connected thereto; at the rear configuration, the restraining member substantially entirely engages an exterior face of the headrest member; at the rear configuration, the head restraint can be compactly packed by being rolled or folded.

The restraining member can have a varying length so as to: adjust the distance between the user's forehead and the restraining member, adjust the distance between the upper portion of the user's head and the restraining member, and adjust the head restraint to different sized heads.

The side members can be articulated to the central member by hoop and loop fasteners (e.g., Velcro® fasteners).

The hoop and loop fasteners can allow regulating the length of the restraining member. Moreover, the hoop and loop fasteners can allow regulating the vertical location of the central member with respect to the side members. This vertical regulation allows positioning the central member exactly in front of the user's (e.g., a child's) forehead. However, when an adult uses the headrest member, the central member can be located in front of his eyes so as to be used as a sleep mask.

The central member can be flexible and can be formed of a soft, rigid though pliable material.

The headrest member can also be flexible and can be formed of a soft, rigid though pliable material.

The mounting arrangement can comprise two pairs of strips. Each pair of strips is articulated to each other by connecting means such as buckles, length regulating elements, or hoop and loop fasteners.

The mounting arrangement can be configured for attaching the head restraint to a seat headrest of the seat.

The mounting arrangement can be used for regulating the height of the head restraint with respect to the seat and to height of the user's head.

The head restraint can further include a sensing unit mounted thereto for detecting situations in which a child or an infant is left alone in the vehicle. Such a sensing unit can be configured with an alert system for alerting such situations.

The head restraint can further include a microphone mounted thereto for amplifying the voice of the user (e.g., a child's voice).

According to a second aspect of the presently disclosed subject matter, there is provided a head restraint comprising:

a headrest member configured with a back portion and two side portions extending therefrom; and
 a restraining member pivotally articulated to said side portions and configured for rotation at least between an upward position and a downward position;
 wherein the side portions of the headrest member are foldable with respect to the back portion so as to allow the headrest member to assume a first state in which the side portions are spaced from each other at a first extent and a second state in which the side portions are spaced from each other to a second extent which is smaller than said first extent.

According to a third aspect of the presently disclosed subject matter, there is provided a seat comprising:
 (a) a seating portion;
 (b) a seat headrest; and
 (c) a head restraint comprising a headrest member configured with a back portion attached to the seat headrest and two side portions extending therefrom; and a restraining member pivotally articulated to said side portions and configured for rotation at least between an upward position and a downward position;
 wherein the side portions of the headrest member are foldable with respect to the back portion so as to allow the headrest member to assume a first state in which the side portions are spaced from each other at a first extent and a second state in which the side portions are spaced from each other to a second extent which is smaller than said first extent.

Any one or more of the following features, designs and configurations can be incorporated in the presently disclosed subject matter according to the second or the third aspects, independently or in combination thereof:

Displacement of the restraining member between its upward position and its downward position can be configured to cause the headrest member to assume its first and second states, respectively.

The back portion can be attached to the seat headrest by various fastening means such as: sewing, clips, a zipper, hoop and loop fasteners, etc.

The head restraint can be attached to various types of seats, such as a booster seat, a safety seat, a stroller, a vehicle seat, a seat of a wheel chair, a chair, a bench, etc.

At the second state, the side portions can be disposed in proximity to the user's ears. This can be useful in reducing noise and thus improving the quality of the user's sleep.

Each of the side portions can be configured with an earphone, so that in the second state the earphones are disposed in proximity to the user's ears for providing sound thereto. The sound can be, for example, a relaxing music, a story, or parent's voice.

The back portion and the side portions can be integral and continuous or attachable to one another.

The back portion and the side portions can be formed as support cushions.

The back portion is configured to provide support to the back portion of the user's head, and the side portions are configured to provide support to the side portions of the user's head. The side portions can constitute a side impact protector for the user's head.

Rotation of the restraining member between the upward and downward positions can be performed by the user himself by one of his hands.

In the downward position, the restraining member can be spaced from the forehead of the user so that a gap extends between the forehead and the restraining member. This gap can provide an extra measure of comfort to the user, as there is no contact between the forehead and the restraining member. However, the gap should not be too great in order to allow the restraining member to effectively operate for delimiting forward movement of the head.

The restraining member can be configured with two side members and a central member disposed therebetween. One of the side members can be pivotally articulated to an exterior face of one side portion of the headrest member, and another one of the side members can be pivotally articulated to an exterior face of another one of the side portions of the headrest member. The pivotal connection can be provided by snap fasteners.

The central member of the restraining member can be formed as a strap.

Each of the side portions can be configured with a delimiting channel formed at its exterior face.

Each of the side members can be configured with a projecting portion configured to be received within its respective delimiting channel and displaced between two extreme ends thereof upon displacement of the restraining member between the upward and downward positions.

The side members and the delimiting channels can be made of a flexible, though hard plastic material. For example, the side members and the delimiting channels can be made of a polymer such as polypropylene.

The delimiting channels can have a shape of an arc, the length of which corresponds to the angle between the headrest member and the restraining member in its upward and downward positions.

The head restraint can be disconnected from the seat headrest.

The head restraint can be modular and can have the following two configurations:
  a frontal configuration in which the restraining member is pivotally mounted to the headrest member to be displaced between its upward and downward positions; and
  a rear configuration in which the restraining member is disposed at the rear side of the headrest member and connected thereto; at the rear configuration, the restraining member substantially entirely engages an exterior face of the headrest member; at the rear configuration, the head restraint can be compactly packed by being rolled or folded.

The restraining member can have a varying length so as to: adjust the distance between the user's forehead and the restraining member, adjust the distance between the upper portion of the user's head and the restraining member, and adjust the head restraint to different sized heads.

The side members can be articulated to the central member by hoop and loop fasteners (e.g., Velcro® fasteners).

The hoop and loop fasteners can allow regulating the length of the restraining member. Moreover, the hoop and loop fasteners can allow regulating the vertical location of the central member with respect to the side members. This vertical regulation allows positioning the central member exactly in front of the user's (e.g., a child's) forehead. However, when an adult uses the headrest member, the central member can be located in front of his eyes so as to be used as a sleep mask.

The central member can be flexible and can be formed of a soft, rigid though pliable material.

The headrest member can also be flexible and can be formed of a soft, rigid though pliable material.

The head restraint can further include a sensing unit mounted thereto for detecting situations in which a child or an infant is left alone in the vehicle. Such a sensing unit can be configured with an alert system for alerting such situations.

The head restraint can further include a microphone mounted thereto for amplifying the voice of the user (e.g., a child's voice).

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1A:
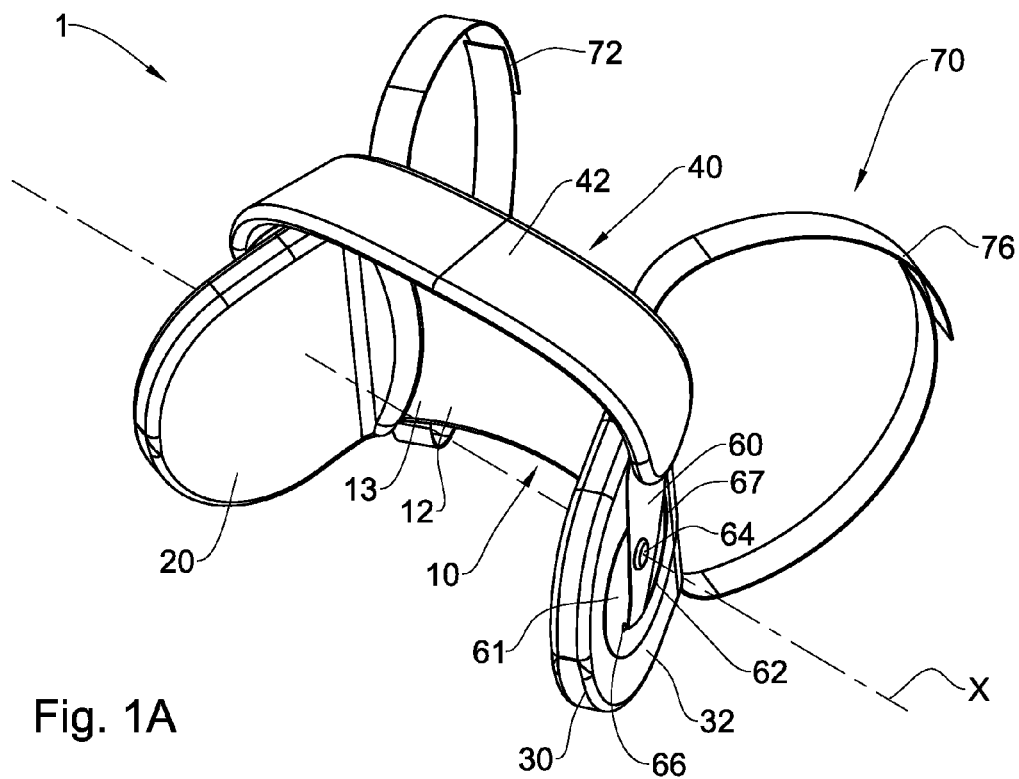
FIG. 1A is a front perspective view of a head restraint with a restraining member in its upward position, in accordance with one example of the presently disclosed subject matter.

Attention is first directed to FIGS. 1A to 1F of the drawings illustrating a head restraint in accordance with one example of the presently disclosed subject matter, generally designated 1.

The head restraint 1 comprises a headrest member 10, a restraining member 40 pivotally articulated thereto, and a mounting arrangement 70 extending from the headrest member 10 for mounting the head restraint 1 as an add-on to a safety seat 3 in which a child can be seated (shown in FIGS. 1E, 1F, 2E and 2F), or to any other seat.

The restraining member 40 is configured to be rotated with respect to the headrest member 10 about an X axis (shown in FIGS. 1B and 2B) between an upward position (shown in FIGS. 1A to 1F) and a downward position (shown in FIGS. 2A to 2F). This rotation can be performed by the user himself, by one of his hands.

Figure 1B:
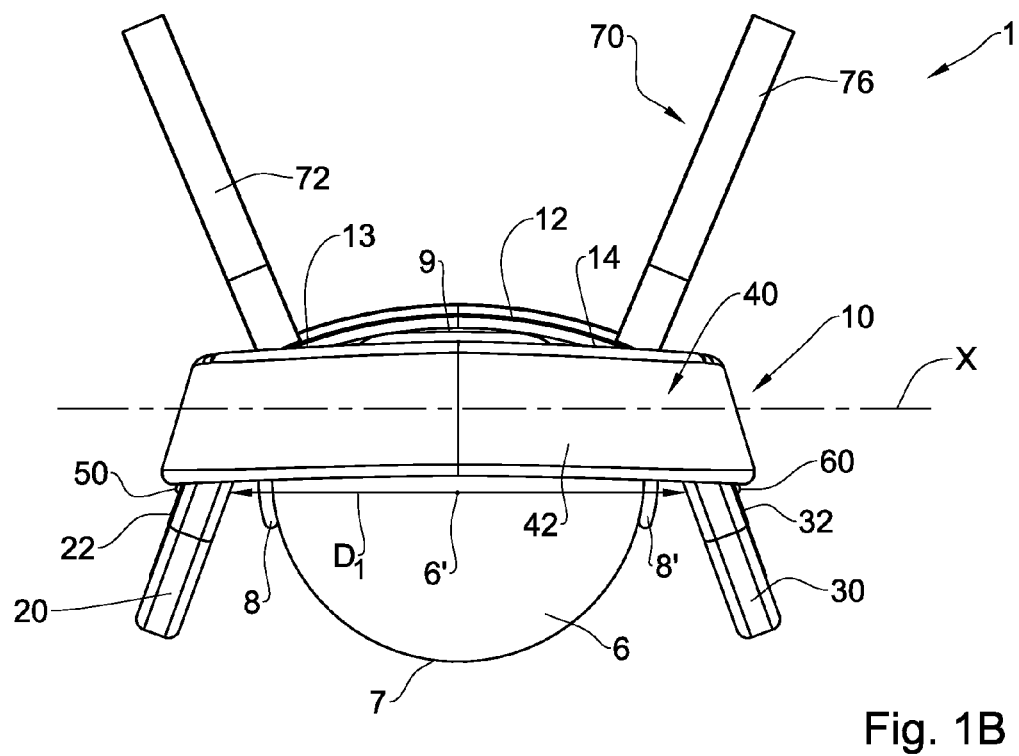
FIG. 1B is a top view of the head restraint of FIG. 1A, with an individual's head superimposed.
Figure 1C:
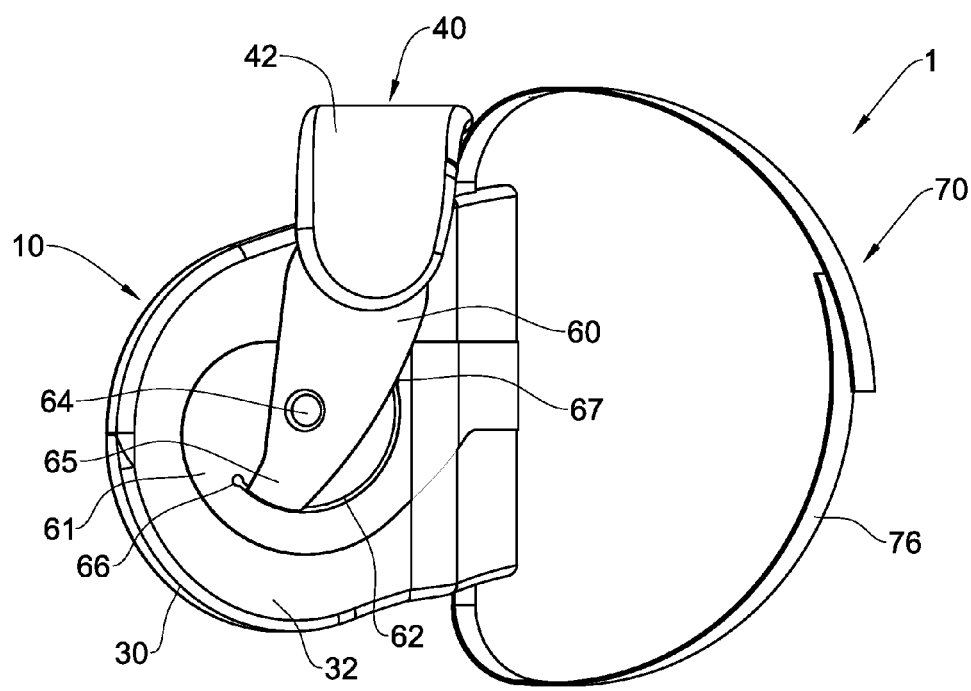
FIG. 1C is a side view of the head restraint of FIG. 1A.
Figure 1D:
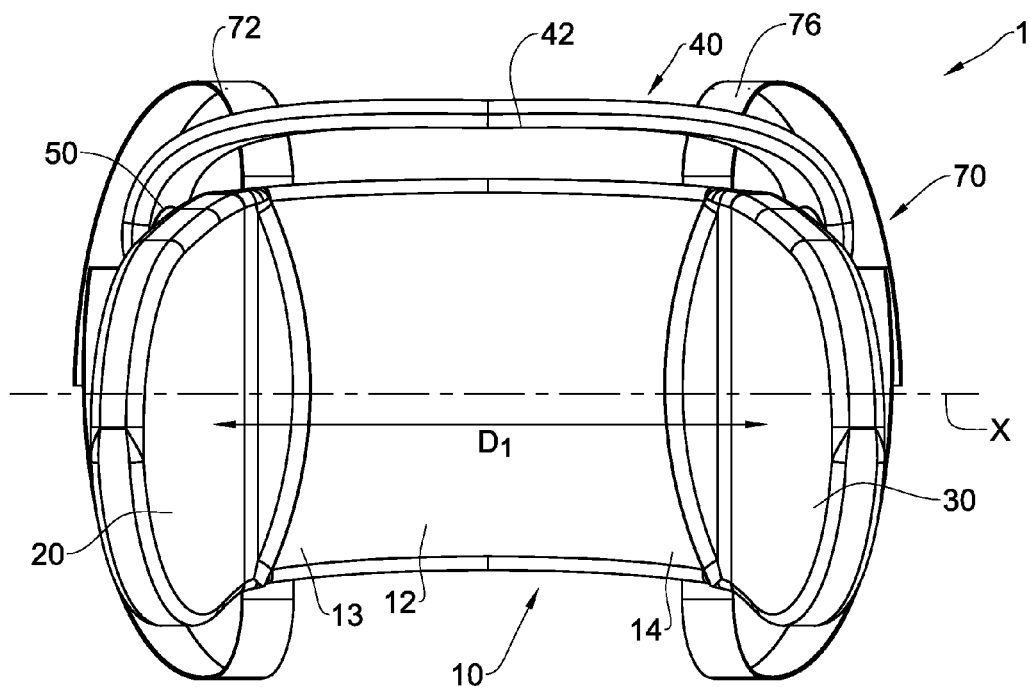
FIG. 1D is a front view of the head restraint of FIG. 1A.
Figure 1E:
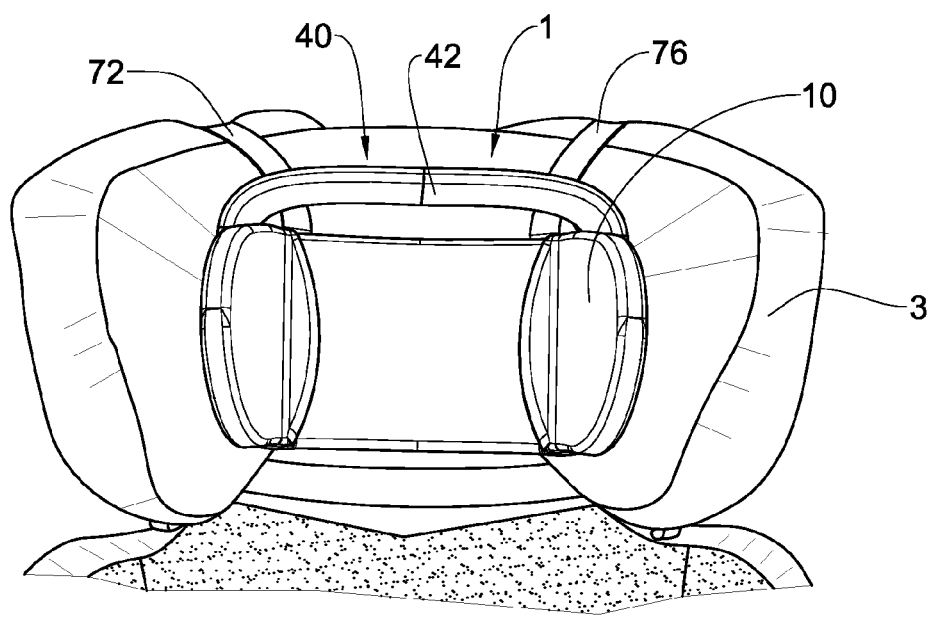
FIG. 1E is the head restraint of FIG. 1D being installed on a safety seat within a vehicle.
Figure 1F:
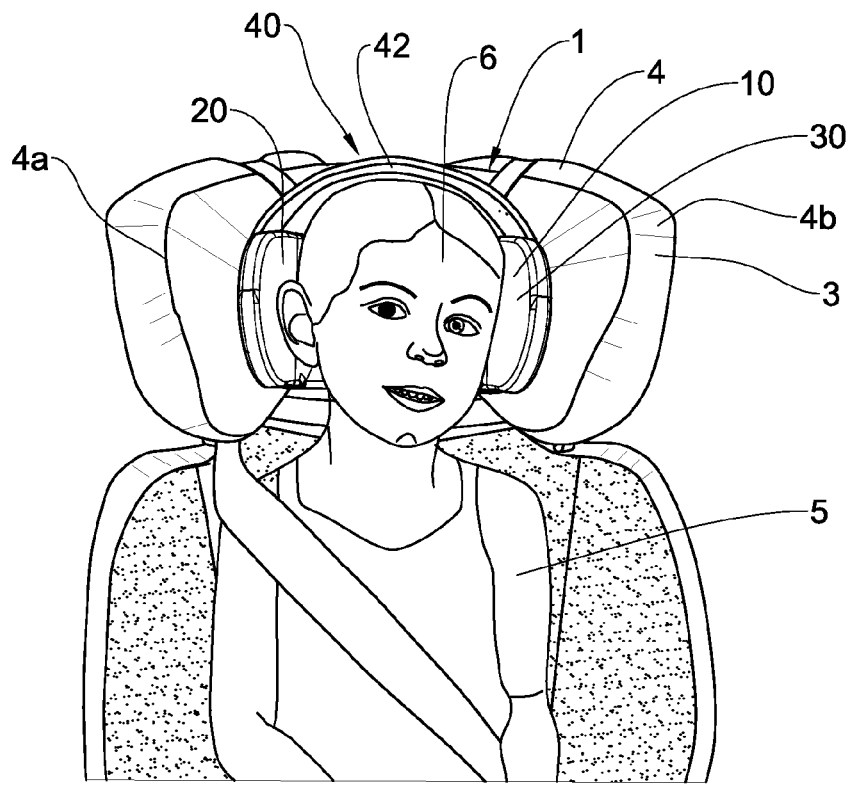
FIG. 1F is the head restraint of FIG. 1E with a child seated on the safety seat and her head positioned at the head restraint.
Figure 2A:
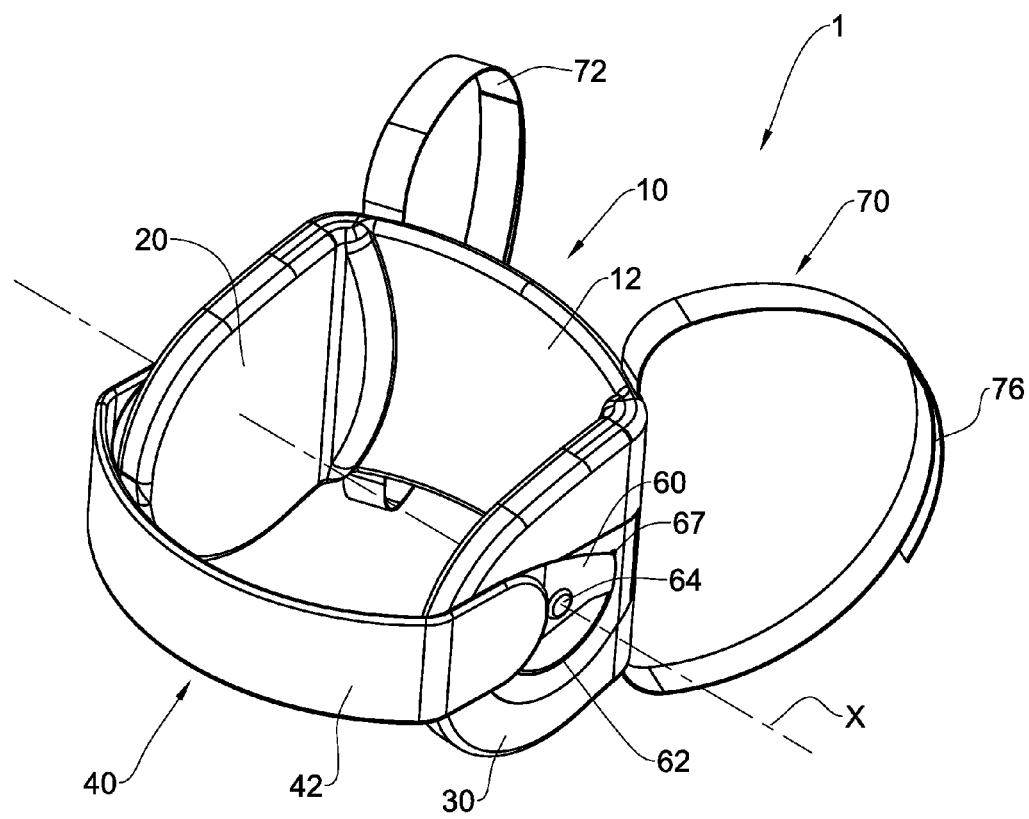
FIG. 2A is a front perspective view of the head restraint of FIG. 1A with the restraining member in its downward position.
Figure 2B:
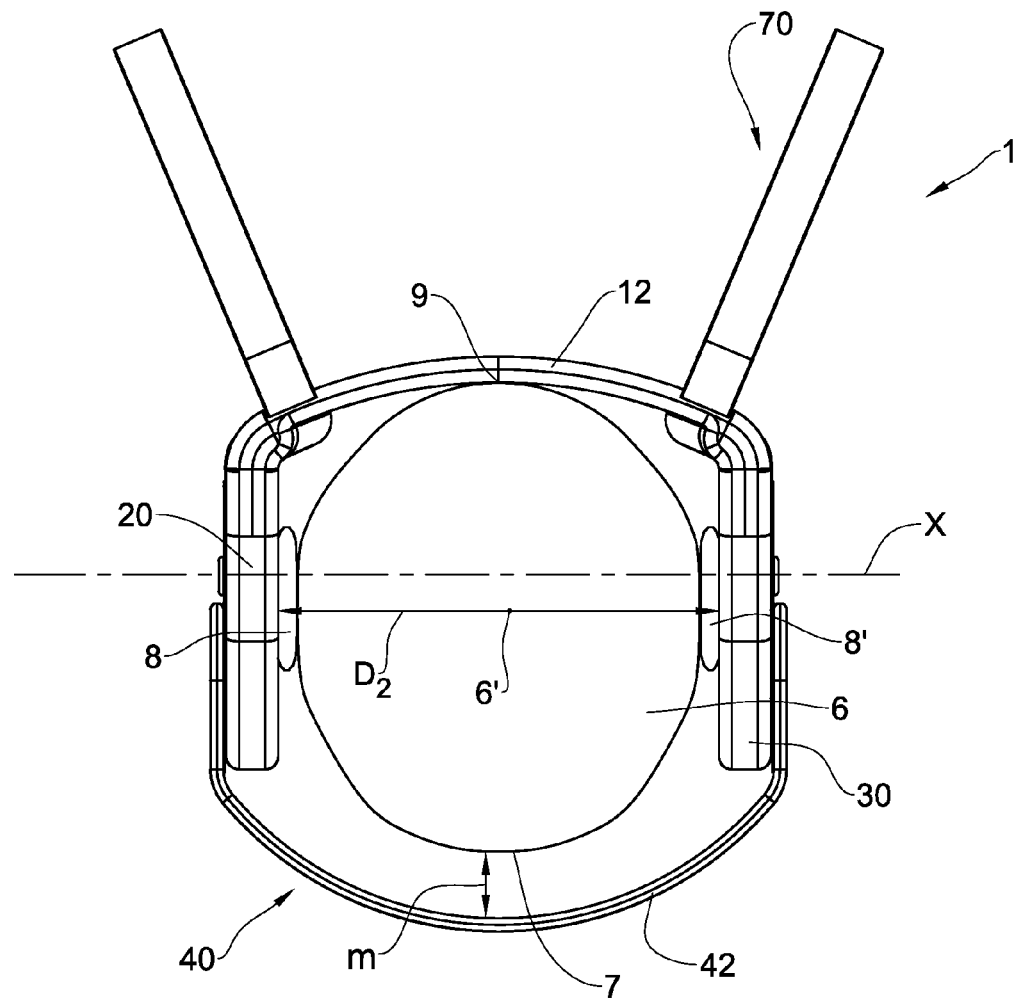
FIG. 2B is an upper view of the head restraint of FIG. 2A.
Figure 2C:
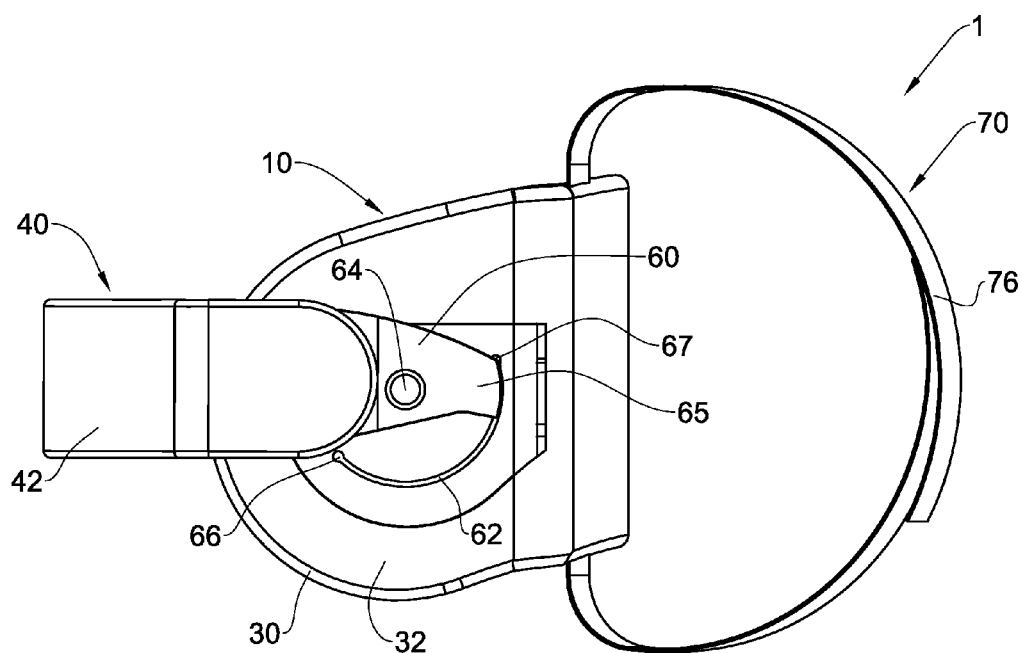
FIG. 2C is a side view of the head restraint of FIG. 2A.
Figure 2D:
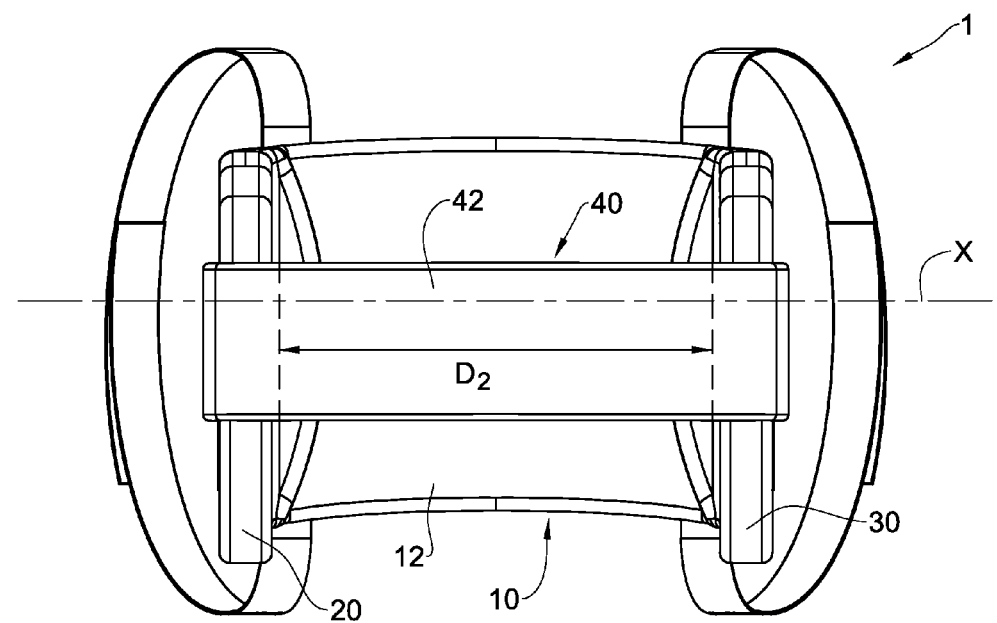
FIG. 2D is a front view of the head restraint of FIG. 2A.
Figure 2E:
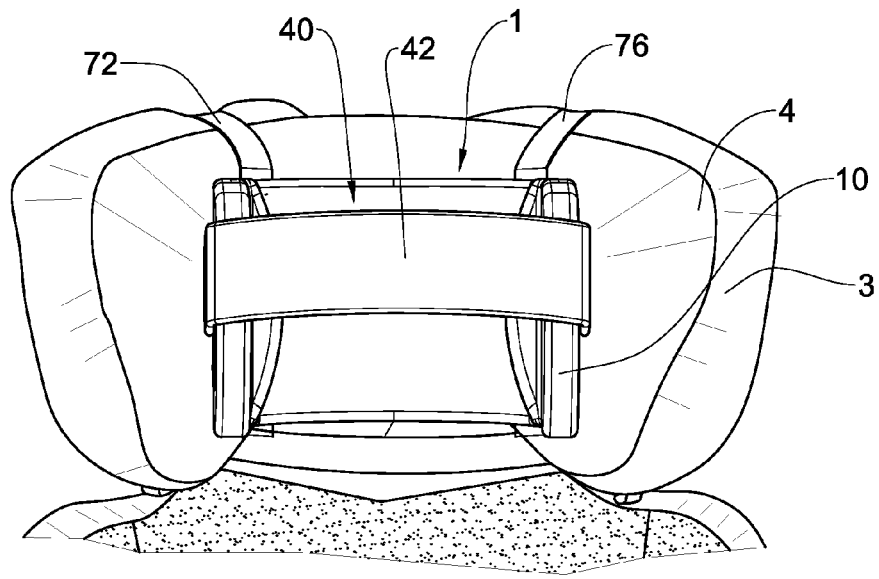
FIG. 2E is the head restraint of FIG. 2D installed on a safety seat within a vehicle.
Figure 2F:
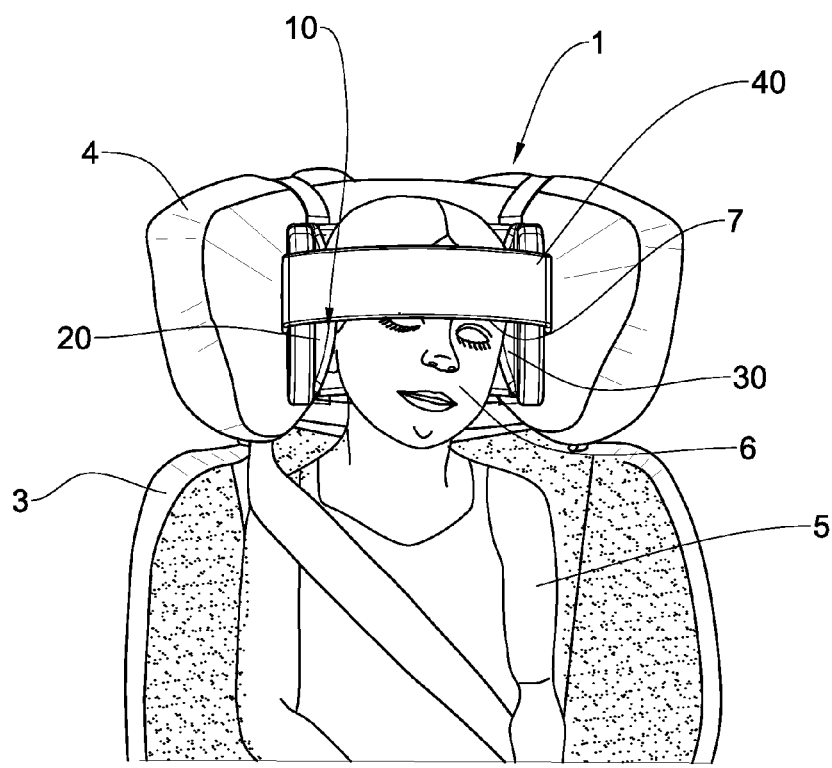
FIG. 2F is the head restraint of FIG. 2E with the child seated on the safety seat and her head is positioned at the head restraint.

Reference is now made to FIGS. 1F and 2F, in order to explain the general manner of operation of the head restraint 1 which is attached to a seat headrest 4 of a safety seat 3.

As shown in FIG. 1F, in the upward position of the restraining member 40, a child 5 is seated on the safety seat 3, her head 6 rests on the headrest member 10, and the restraining member 40 is disposed above the head 6 in a bow-like fashion, however with a sufficient gap over the child's head. In addition, the headrest member 10 is in its first state, in which its first and second side portions 20 and 30 are spaced from each other at a first extent. In this position, the child 5 is awake and her head 6 is free to move in the forward direction and to each side, however limited to a certain extent by the seat headrest's side portions 4a and 4b.

As shown in FIG. 2F, the child 5 has fallen asleep and thus the head restraint 1 is in the downward position. In this position, the restraining member 40 is disposed in front of a forehead 7 of the child 5 in order restrain the movement of the head 6 in the forward direction. In addition, the headrest member 10 is in its second state in which its side portions are spaced from each other to a second extent which is smaller than the first extent, thereby restraining movement of the head 6 to the sides. This restraint by the restraining member 40 and the side portions of the headrest member 10 provide increased stability and comfortable support of the head 6 while the child 5 sleeps. In particular, the restraining member 40 prevents the user's head 6 from falling forward, and the first and the second side portions 20 and 30 prevent the user's head 6 from tilting to the left or the right side. Moreover, the above restraint can provide increased head and neck stability to a user upon turning, braking or collision of the vehicle.

Reference is now made to FIGS. 1A to 1F, in order to explain in a detailed manner the structure and manner of operation of the head restraint 1 with the restraining member 40 in its upward position and the headrest member 10 in its first state.

The headrest member 10 has a back portion 12, a first side portion 20 and a second side portion 30. The back portion 12 and the first and second side portions 20 and 30 are formed as support cushions for the child's head 6. As shown in FIG. 1B, the back portion 12 provides support to a back portion 9 of the head 6.

The first side portion 20 and the second side portion 30 extend from two opposite ends of the back portion 12, i.e., a first end 13 and a second end 14, respectively. Moreover, the first side portion 20 and the second side portion 30 are foldable with respect to the central portion 12 between the first state (FIGS. 1A to 1F) and the second state of the headrest member 10 (FIGS. 2A to 2F).

The restraining member 40 is configured with a first side member 50, a second side member 60 and a central member 42 disposed therebetween. The central member 42 is formed as a strap and as shown in FIG. 1F, is disposed above the child's head 6.

The first side member 50 and the second side member 60 are attached to the central member 42 by hoop and loop fasteners. The hoop and loop fasteners allow regulating the length of the restraining member 40 so as to adjust the distance between the child's forehead and the restraining member 40 (in the downward position of the restraining member), the distance between the child's upper portion of the head and the restraining member 40 (in the upward position of the restraining member) and to adjust the head restraint 1 to different sized heads.

Moreover, the hoop and loop fasteners allow regulating the vertical location of the central member 42 with respect to the first and the second side members 50 and 60. For example, if the user of the head restraint 1 wants to use the central member 42 as a sleep mask, he can position the central member 42 with respect to the first and the second side members 50 and 60 so that the central member 42 is located in front of his eyes, instead of his forehead.

Pivotal articulation of the restraining member 40 to the headrest member 10 is provided by articulation of the first side member 50 to an exterior face 22 (shown in FIG. 3) of the first side portion 20 by means of a first snap fastener 54 (shown in FIG. 3), and by articulation of the second side member 60 to an exterior face 32 of the second side portion 30, by means of a second snap fastener 64.

The first side portion 20 is configured with a first delimiting channel 52 (shown in FIG. 3) formed at the exterior face 22, and the second side portion 30 is configured with a second delimiting channel 62 formed at the exterior face 32. The first delimiting channel 52 is formed within a channel element 51 which is mounted to the exterior face 22. The second delimiting channel 62 is formed within a channel element 61 which is mounted to the exterior face 32. According to the particular example, the channel elements 51 and 61 of the exterior faces 22 and 32 are related to a single element by being connected by a connecting strip (seen in FIG. 3).

The first delimiting channel 52 and the second delimiting channel 62 are arced shaped, the length of which corresponds to the angle between the headrest member 10 and the restraining member 40 between its upward and downward positions. According to the present example, this angle is about 120°.

Figure 3:
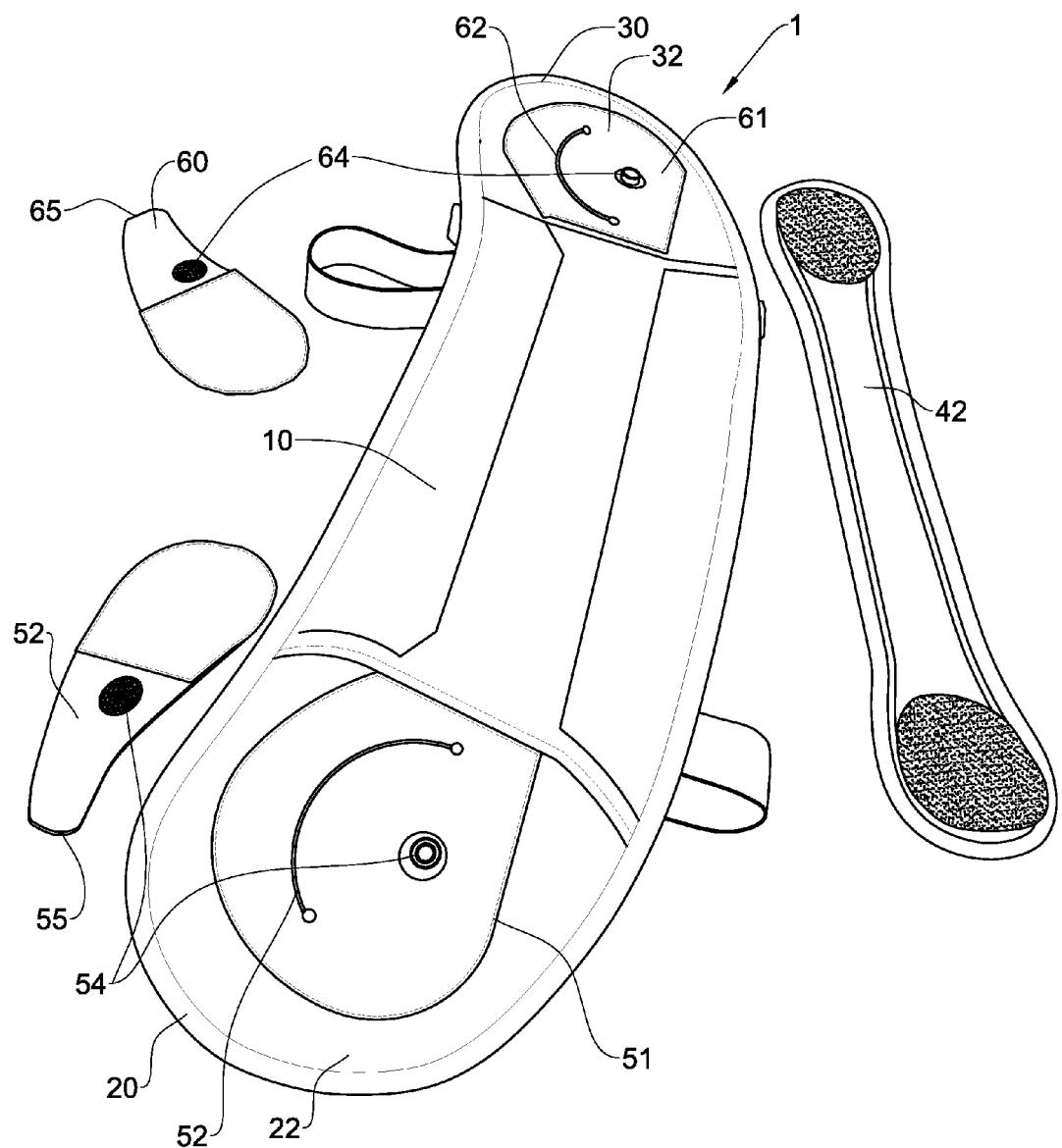
FIG. 3 is the head restraint of FIG. 1A in a disassembled configuration in which the restraining member and the headrest member of the head restraint are disassembled from each other.

As can be seen in FIG. 3, the first side member 50 is configured with a first projecting portion 55 which is received and slidingly displaceable within the first delimiting channel 52 between two extreme ends thereof upon displacement of the restraining member 40 between its upward and downward positions.

As shown in FIGS. 1A and 1C, the second side member 60 is configured with a second projecting portion 65 (not shown in FIG. 1A) which is received and slidingly displaceable within the second delimiting channel 62 between a lower end 66 and an upper end 67 upon displacement of the restraining member 40 between the upward and downward positions, respectively. The lower end 66 restricts further upward pivoting of the restraining member 40 beyond its upward position, and the upper end 66 restricts further downward pivoting of the straining member 40 beyond its downward position, thereby, for example, preventing the central member 42 to be located lower than a predetermined level, e.g., in front of the child's eyes.

The central member 42 is formed of a flexible and soft material. This material is rigid though pliable. The headrest member 10 is formed of flexible and soft cushioning material. The first side member 50, the second side member 60, the two channel elements 51 and 61, are all made of a hard and a rigid though pliable plastic material. According to the present example, this material is polymer, and in particular, polypropylene.

It should be indicated that according to other examples, the headrest member 10 is not necessarily flexible, but in any case should allow pivoting of its side portions.

The mounting arrangement 70 comprises a first pair of strips 72 and a second pair of strips 76. Each pair of strips is articulated to each of the other hoop and loop fasteners. According to other examples, the strips are articulated to each other known mechanical means.

As indicated above, the headrest member 10 is shown in FIGS. 1A to 1F in its first state. At this state, the first side portion 20 and the second side portion 30 are spaced from each other at a first extent represented by a distance D1 (FIGS. 1B and 1D). The distance D1 is taken along an axis that is parallel to the axis of rotation X and passes through a central point 6' of the head 6. The first state of the headrest member 10 is in its normal state to which the side portions of the headrest member 10 tend to revert. The normal state is provided due to the geometry and the structure of the headrest member 10.

The restraining member 40 is structured so that the distance between the first and the second side members 50 and 60 is substantially constant during the pivoting of the restraining member 40 between its upward and downward positions. In light of this characteristic of the restraining member 40, and the fact that the distance between the first and the second side members 50 and 60 is smaller than the distance between the external faces 22 and 32 at the upward configuration of the restraining member 40, displacement of the restraining member 40 from its upward position to its downward position causes the headrest member 10 to assume its second state. This result is provided by the first and the second side members 50 and 60, which bend the first and the second side portions 20 and 30 with respect to the back portion 12, respectively, causing them to approach each other. Likewise, displacement of the restraining member 40 from its downward position to its upward position causes the headrest member 10 to assume its normal first state.

Reference is now made to FIGS. 2A to 2F, in order to explain in a detailed manner the structure and manner of operation of the head restraint 1 with the restraining member 40 in its downward position and the headrest member 10 in its second state.

As shown in FIG. 2B, in the downward position of restraint member 40, its central member 42 is located in front of the forehead 7 of the child's head 6, and spaced therefrom so that a gap m extends between the central member 42 and the forehead 7. The gap m provides an extra measure of comfort to the child 5, since when the child 5 is awake, there is no contact between the forehead 7 and the restraining member 40. However, the gap should not be too great in order to allow the restraining member 40 to effectively operate when the contact between the forehead 7 and the central member 42 is established. This contact may be established if the child's head 6 will fall in the forward direction when she falls asleep.

In addition, as shown in FIG. 2B, the first and the second side portions 20 and 30 provide support to the sides 8 and 8' of the child's head 6 (in FIG. 2B). The first and the second side portions 20 and 30 further constitute a side impact protector for the user's head 6.

As indicated above, the headrest member 10 is shown in FIGS. 2A to 2F in its second state. At this state, the first side portion 20 and the second side portion 30 are spaced from each other at a second extent represented by a distance D2 (shown in FIGS. 2B and 2D), which is smaller than the distance D1. The distance D2 is taken along an axis that is parallel to the axis of rotation X and passes through the central point 6' of the head 6. As shown in FIG. 2B, the first and the second side portions 20 and 30 are disposed in proximity to the user's temples, thereby reducing noise that approaches the child's ears and improving the quality of her sleep.

The distance D2 can be regulated by changing the length of the restraining member 40. For example, if the child feels discomfort with the first and the second side portions touching his ears, the length of the restraining member 40 can be increased, thereby increasing the distance D2.

Figure 4A:
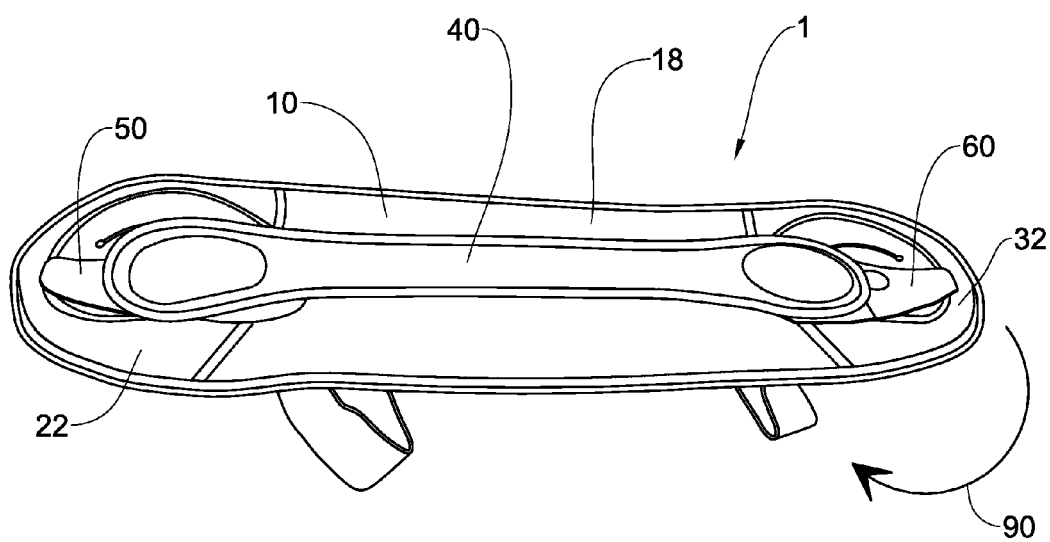
FIG. 4A is the head restraint of FIG. 1A in a rear configuration in which the restraining member is located at the rear side of the headrest member and connected thereto.

The head restraint of the presently disclosed subject matter is modular, and has two configurations: a frontal configuration (shown in FIGS. 1A to 1F and 2A to 2F) and a rear configuration (shown in FIG. 4A).

As opposed to the frontal configuration in which the restraining member 40 is pivotable between its upward and downward positions, in the rear configuration, the restraining member 40 is not displaceable between these positions.

Reference is now made to FIG. 3 in which the head restraint 1 is shown in its disassembled configuration. At this configuration, the headrest member 10 is disengaged from the restraining member 40. Moreover, the restraining member 40 itself is disassembled so that the central member 42 is disconnected from the first side member 50 and the second side member 60.

Reference is now made to FIG. 4A, in order to describe the rear configuration of the head restraint 1 in a detailed manner. At the rear configuration, the first and the second side members 50 and 60 are articulated to a rear side of the headrest member 10 and connected thereto. In particular, the restraining member 40 entirely engages an exterior face 18 of the headrest member 10, the first side member 50 is articulated to the exterior face 22 by means of a first snap fastener 54 (not seen in FIG. 4A), and the second side member 60 is articulated to the exterior face 32 by means of the second snap fastener 64. The first and the second projecting portions are extracted from their respective first and second delimiting channels. As shown in FIG. 4A, in order to obtain full engagement of the restraining member 40 with the exterior face 18 of the headrest member 10, the length of the restraining member 40 is decreased respectively.

At the rear configuration, the head restraint 1 is inoperative, and can be transported from place to place to be mounted on different seats, when needed. Moreover, at the rear configuration, the head restraint 1 can be compactly packed by being rolled or folded in the direction of arrow 90.

Figure 4B:
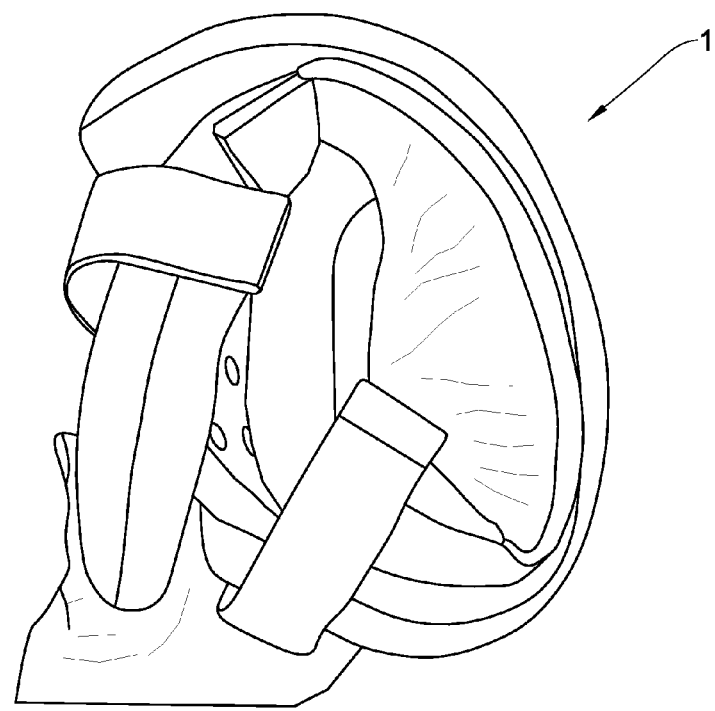
FIG. 4B is the head restraint of FIG. 4A in its packed form.
Figure 5:
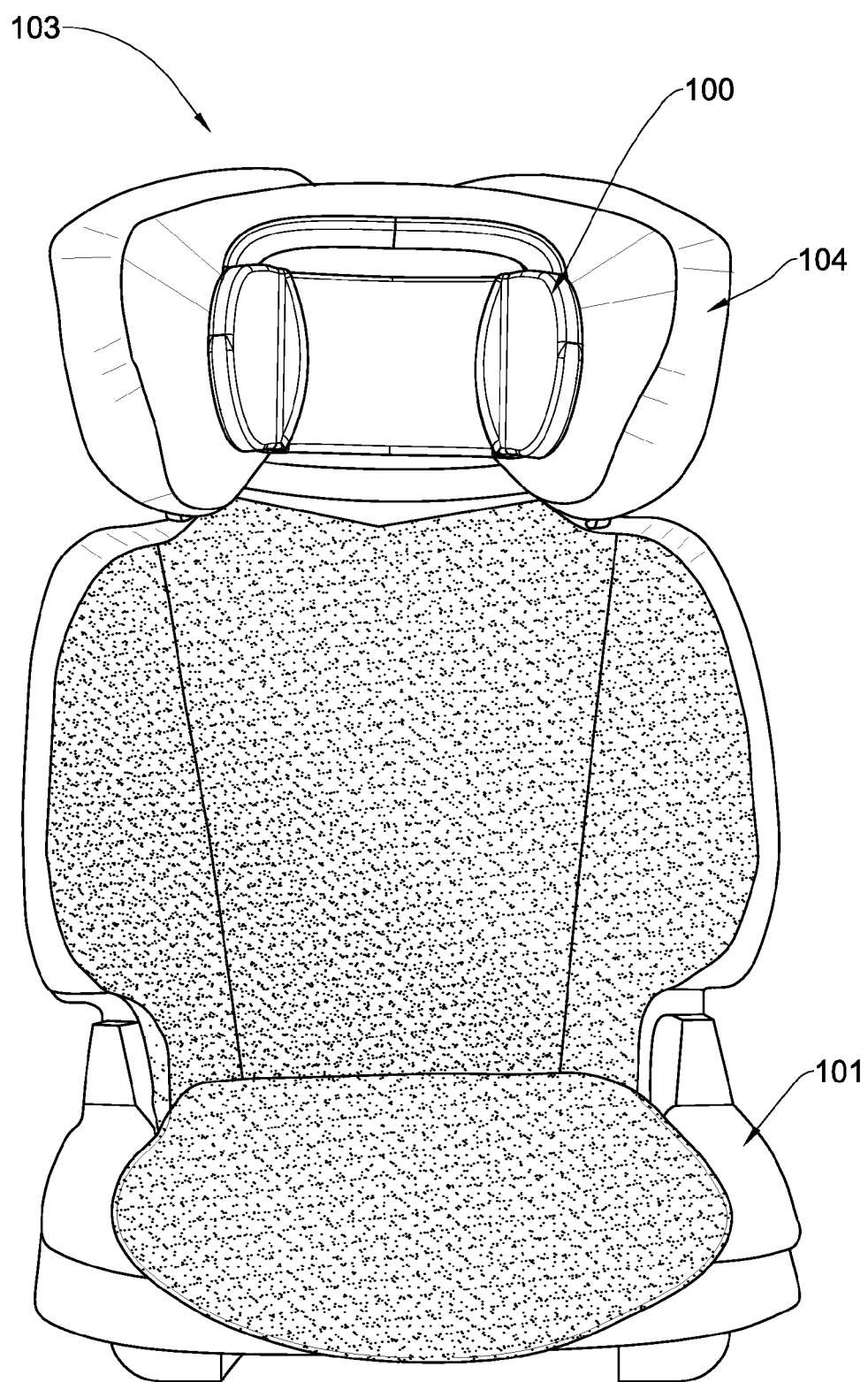
FIG. 5 is a front view of a head restraint integrated with a safety seat, in accordance with another example of the presently disclosed subject matter.

Reference is now made to FIG. 4B, in which the head restraint 1 is shown in its packed form. This form is obtained by rolling the head restraint 1 of FIG. 4A in the direction of arrow 90. As seen in FIG. 4B, in the packed form, the head restraint 1 is very compact and can be grasped by one hand of an adult.

Attention is now directed to FIGS. 5 and 6A to 6F of the drawings illustrating a safety seat 103 with a head restraint 100 in accordance with another example of the presently disclosed subject matter.

The safety seat 103 is configured with a seating portion 101 configured for supporting a body of a child and a seat headrest 104 configured for supporting a head of a child. The head restraint 100 is attached to and integrated with the seat headrest 104 of by sewing, and eventually constitutes a part of the safety seat 103.

With reference to FIGS. 6A to 6F, the head restraint 100 comprises a headrest member 110 and a restraining member 140 pivotally articulated thereto. The restraining member 140 is configured to be rotated with respect to the headrest member 110 about an X axis (shown in FIGS. 6B and 7B) between an upward position (shown in FIGS. 6A to 6F) and a downward position (shown in FIGS. 7A to 7F). This rotation can be performed by the user himself, by one of his hands.

Figure 6A:
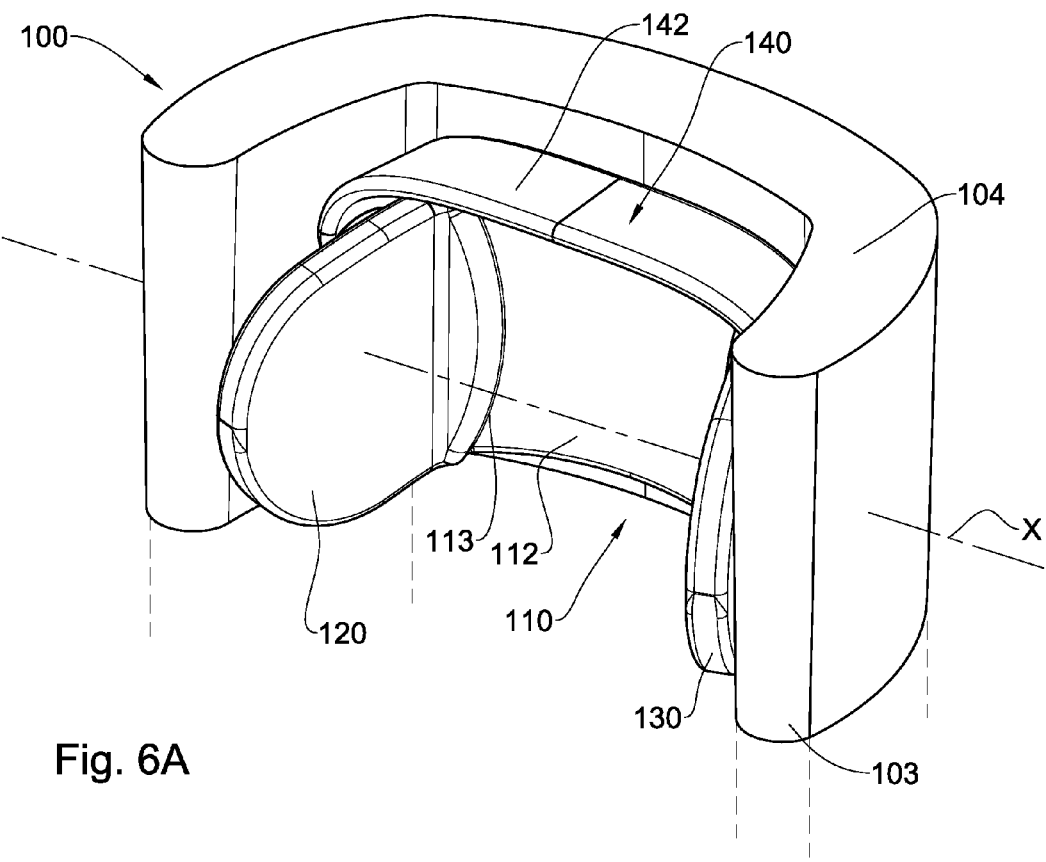
FIG. 6A is a front perspective view of the head restraint in accordance with the example of FIG. 5, with a restraining member in its upward position.
Figure 6B:
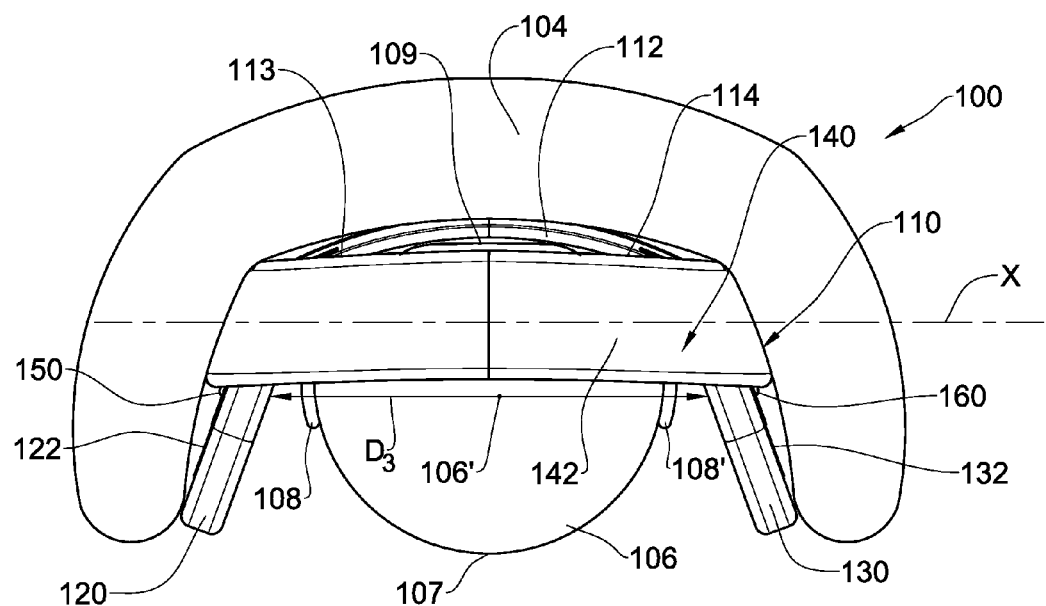
FIG. 6B is a top view of the head restraint of FIG. 6A, with an individual's head superimposed.
Figure 6C:
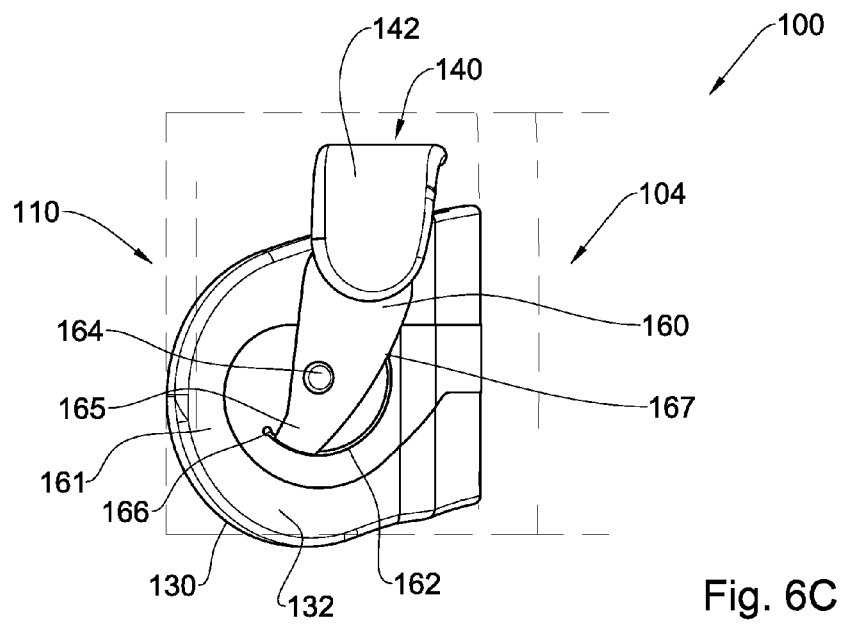
FIG. 6C is a side view of the head restraint of FIG. 6A.
Figure 6D:
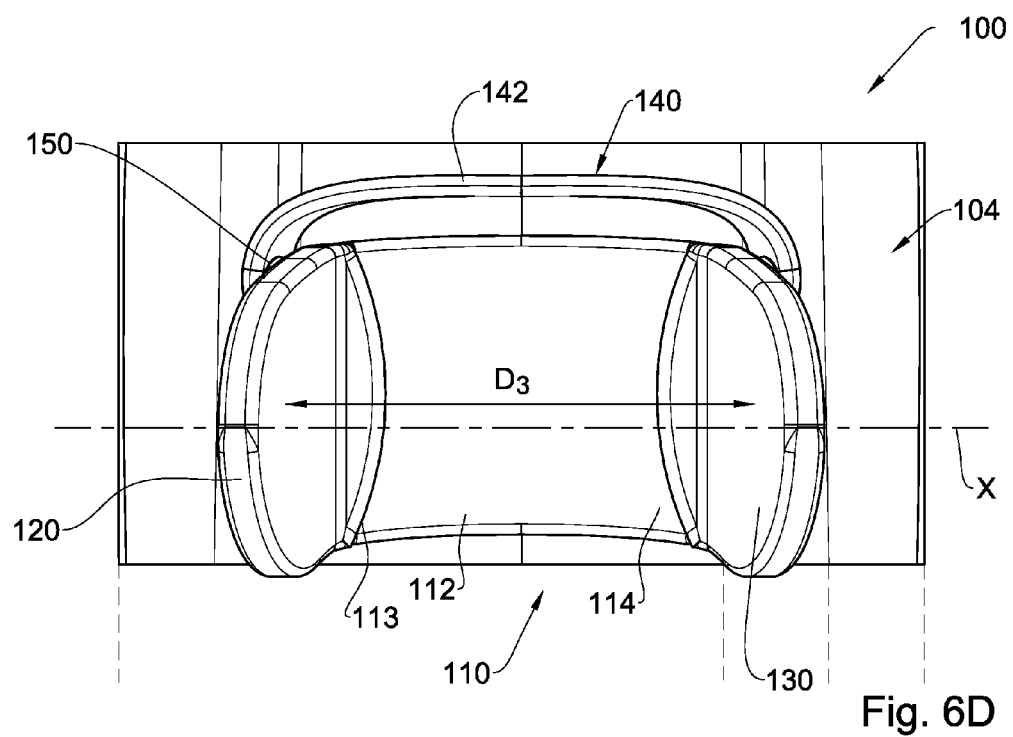
FIG. 6D is a front view of the head restraint of FIG. 6A.
Figure 6E:
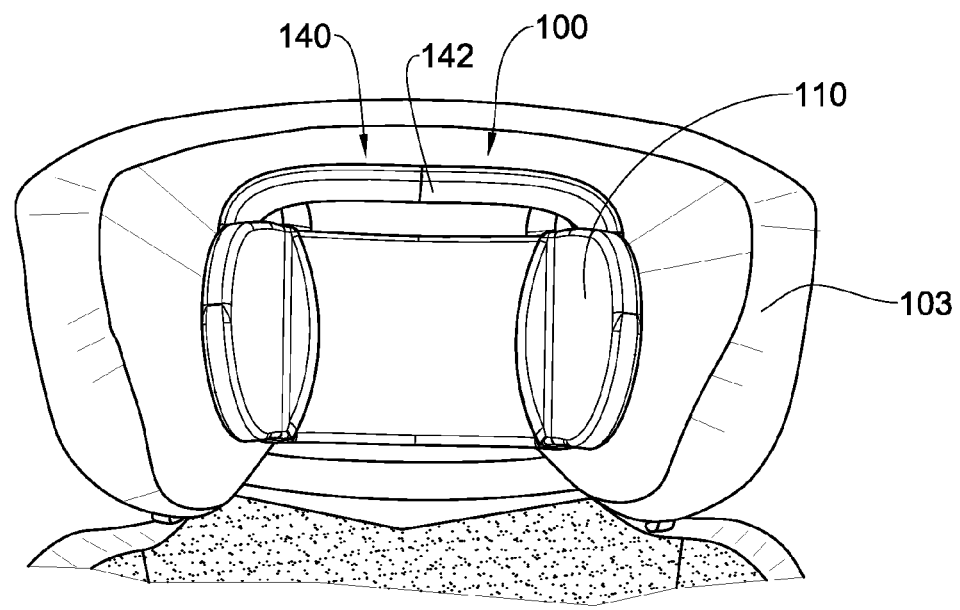
FIG. 6E is the head restraint of FIG. 6D being installed on a safety seat within a vehicle.
Figure 6F:
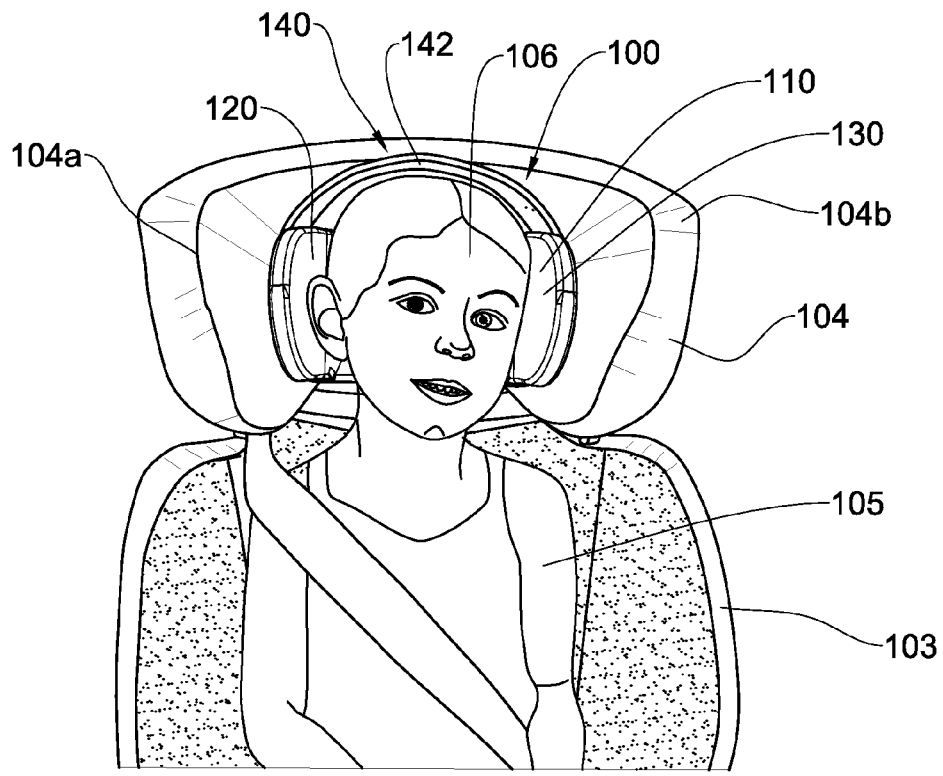
FIG. 6F is the head restraint of FIG. 6E with a child seated on the safety seat and her head positioned at the head restraint.
Figure 7A:
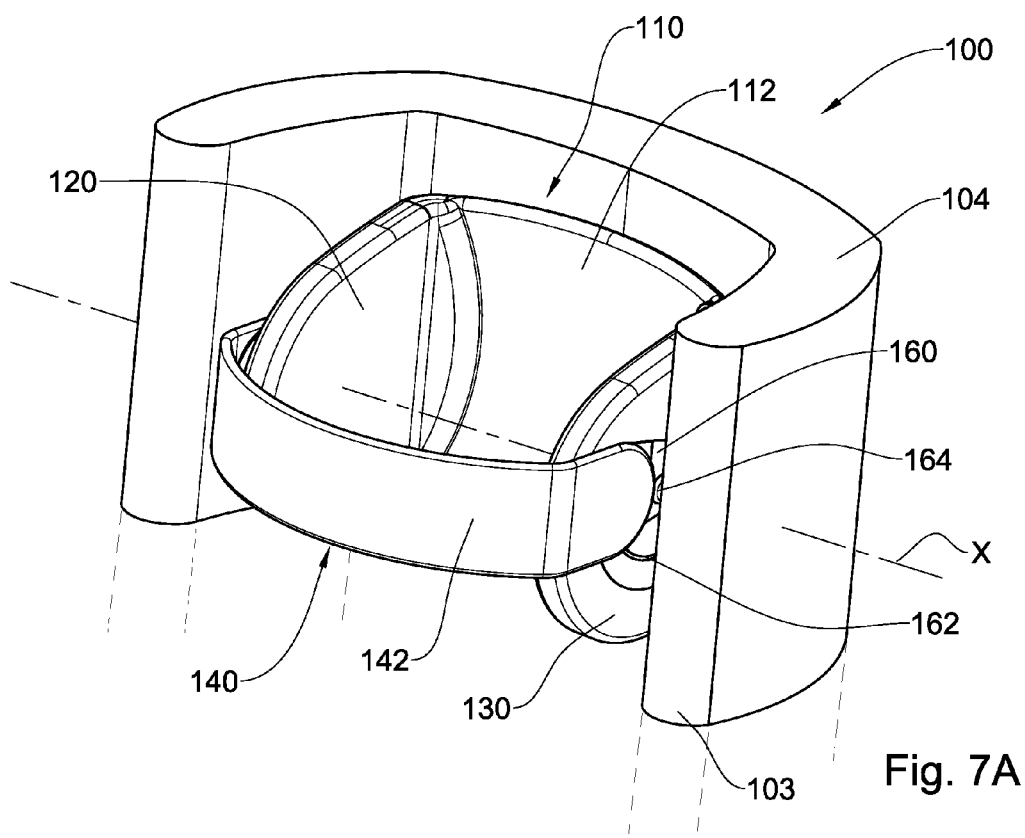
FIG. 7A is a front perspective view of the head restraint of FIG. 6A with the restraining member in its downward position.
Figure 7B:
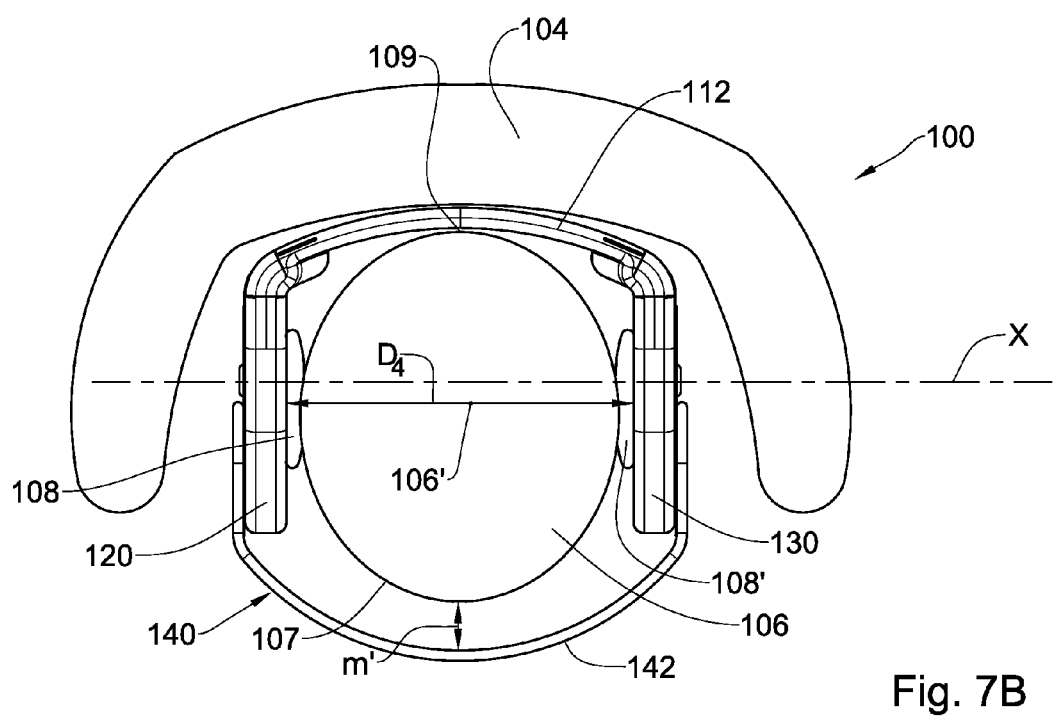
FIG. 7B is an upper view of the head restraint of FIG. 7A.
Figure 7C:
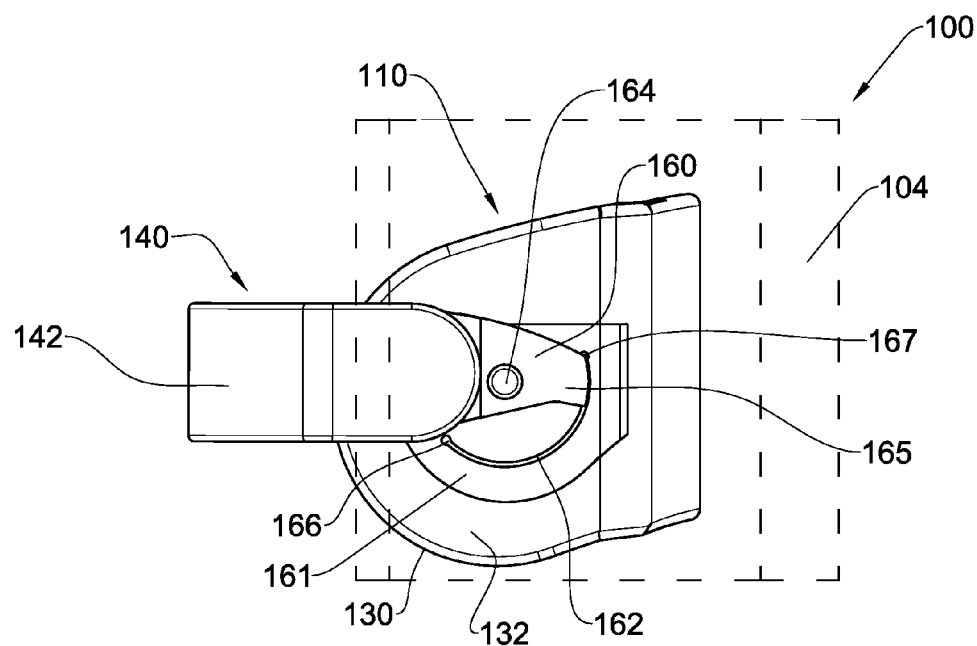
FIG. 7C is a side view of the head restraint of FIG. 7A.
Figure 7D:
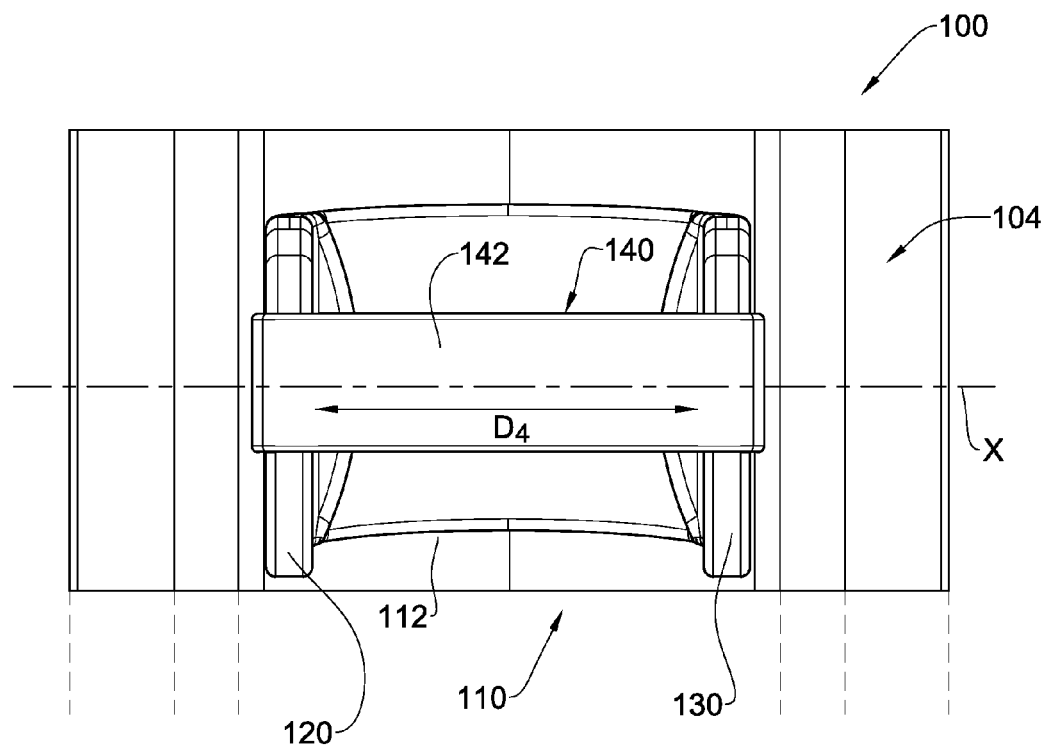
FIG. 7D is a front view of the head restraint of FIG. 7A.
Figure 7E:
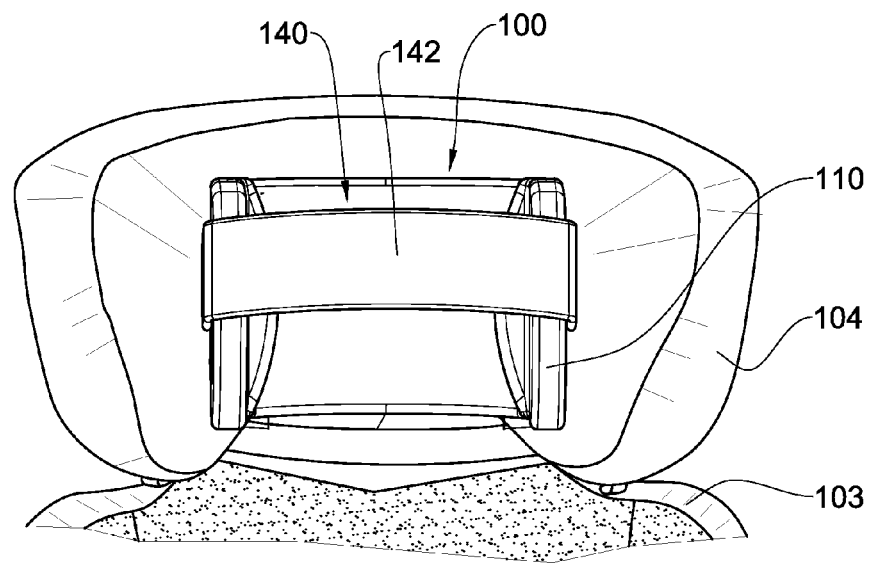
FIG. 7E is the head restraint of FIG. 7D integrated with a safety seat within a vehicle.
Figure 7F:
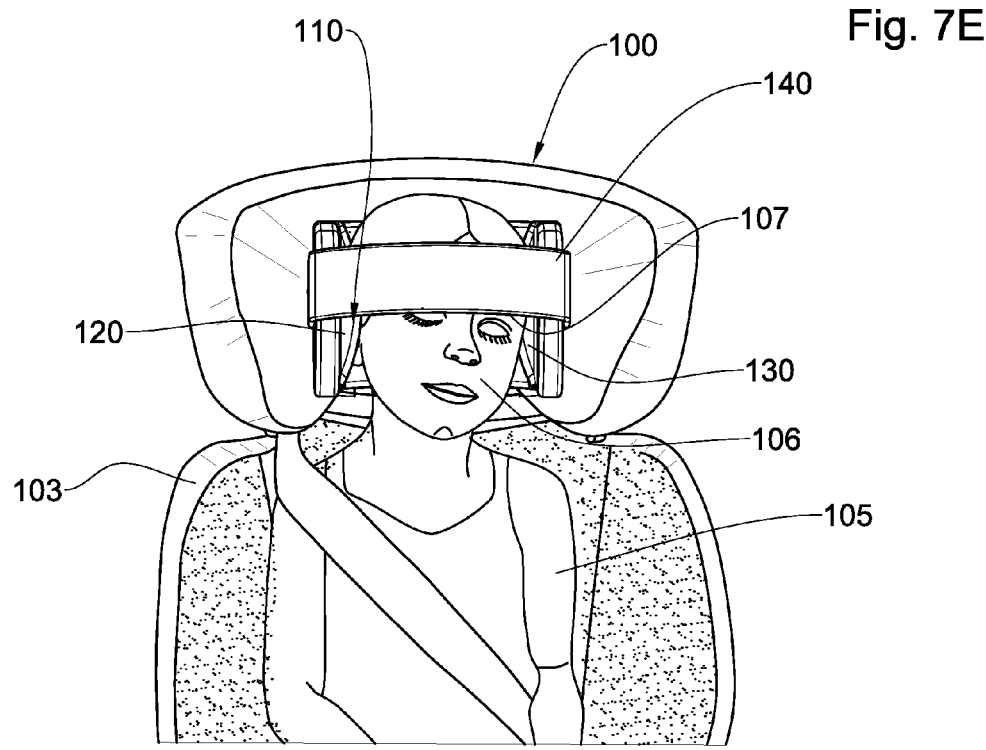
FIG. 7F is the head restraint of FIG. 7E with the child seated on the safety seat and her head is positioned at the head restraint.

Reference is now made to FIGS. 6F and 7F, in order to explain the general manner of operation of the head restraint 100.

As shown in FIG. 6F, in the upward position of the restraining member 140, a child 105 is seated on the safety seat 103, her head 106 rests on the headrest member 110, and the restraining member 140 is disposed above the head 106 in a bow-like fashion, however with a sufficient gap over the child's head. In addition, the headrest member 110 is in its first state, in which its first and second side portions 120 and 130 are spaced from each other at a first extent. In this position, the child 105 is awake and her head 106 is free to move in the forward direction and to each side, however limited to a certain extent by the seat's side portions 104*a* and 104*b* of the seat headrest 104.

As shown in FIG. 7F, the child 105 has fallen asleep and thus the head restraint 100 is in the downward position. In this position, the restraining member 140 is disposed in front of a forehead 107 of the child 105 in order restrain the movement of the head 106 in the forward direction. In addition, the headrest member 110 is in its second state in which its side portions are spaced from each other to a second extent which is smaller than the first extent, thereby restraining movement of the head 106 to the sides. This restraint by the restraining member 140 and the side portions of the headrest member 110 provide increased stability and comfortable support of the head 106 while the child 105 sleeps. In particular, the restraining member 140 prevents the user's head 106 from falling forward, and the first and the second side portions 120 and 130 prevent the user's head 106 from tilting to the left or the right side. Moreover, the above restraint can provide increased head and neck stability to a user upon turning, braking or collision of the vehicle.

Reference is now made to FIGS. 6A to 6F, in order to explain in a detailed manner the structure and manner of operation of the head restraint 100 with the restraining member 140 in its upward position and the headrest member 110 in its first state.

The headrest member 110 has a back portion 112, a first side portion 120 and a second side portion 130. The back portion 112 and the first and second side portions 120 and 130 are formed as support cushions for the child's head 106. As shown in FIG. 6B, the back portion 112 provides support to a back portion 109 of the head 106.

The first side portion 120 and the second side portion 130 extend from two opposite ends of the back portion 112, i.e., a first end 113 and a second end 114, respectively. Moreover, the first side portion 120 and the second side portion 130 are foldable with respect to the central portion 112 between the first state (FIGS. 6A to 6F) and the second state of the headrest member 110 (FIGS. 7A to 7F).

The back portion 112 is attached to and integrated with the seat headrest 104 by sewing.

The restraining member 140 is configured with a first side member 150, a second side member 160 and a central member 142 disposed therebetween. The central member 142 is formed as a strap and as shown in FIG. 6F, is disposed above the child's head 106.

The first side member 150 and the second side member 160 are attached to the central member 142 by hoop and loop fasteners. The hoop and loop fasteners allow regulating the length of the restraining member 140 so as to adjust the distance between the child's forehead and the restraining member 140 (in the downward position of the restraining member), the distance between the child's upper portion of the head and the restraining member 140 (in the upward position of the restraining member) and to adjust the head restraint 100 to different sized heads.

Moreover, the hoop and loop fasteners allow regulating the vertical location of the central member 142 with respect to the first and the second side members 150 and 160. For example, if the user of the head restraint 100 wants to use the central member 142 as a sleep mask, he can position the central member 142 with respect to the first and the second side members 150 and 160 so that the central member 142 is located in front of his eyes, instead of his forehead.

Pivotal articulation of the restraining member 140 to the headrest member 110 is provided by articulation of the first side member 150 to an exterior face 122 (shown in FIG. 8) of the first side portion 120 by means of a first snap fastener 154 (shown in FIG. 8), and by articulation of the second side member 160 to an exterior face 132 of the second side portion 130, by means of a second snap fastener 164.

The first side portion 120 is configured with a first delimiting channel 152 (shown in FIG. 8) formed at the exterior face 122, and the second side portion 130 is configured with a second delimiting channel 162 formed at the exterior face 132. The first delimiting channel 152 is formed within a channel element 151 which is mounted to the exterior face 122. The second delimiting channel 162 is formed within a channel element 161 which is mounted to the exterior face 132. According to the particular example, the channel elements 151 and 161 of the exterior faces 122 and 132 are related to a single element by being connected by a connecting strip (seen in FIG. 8).

The first delimiting channel 152 and the second delimiting channel 162 are arced shaped, the length of which corresponds to the angle between the headrest member 110 and the restraining member 140 between its upward and downward positions. According to the present example, this angle is about 120°.

Figure 8:
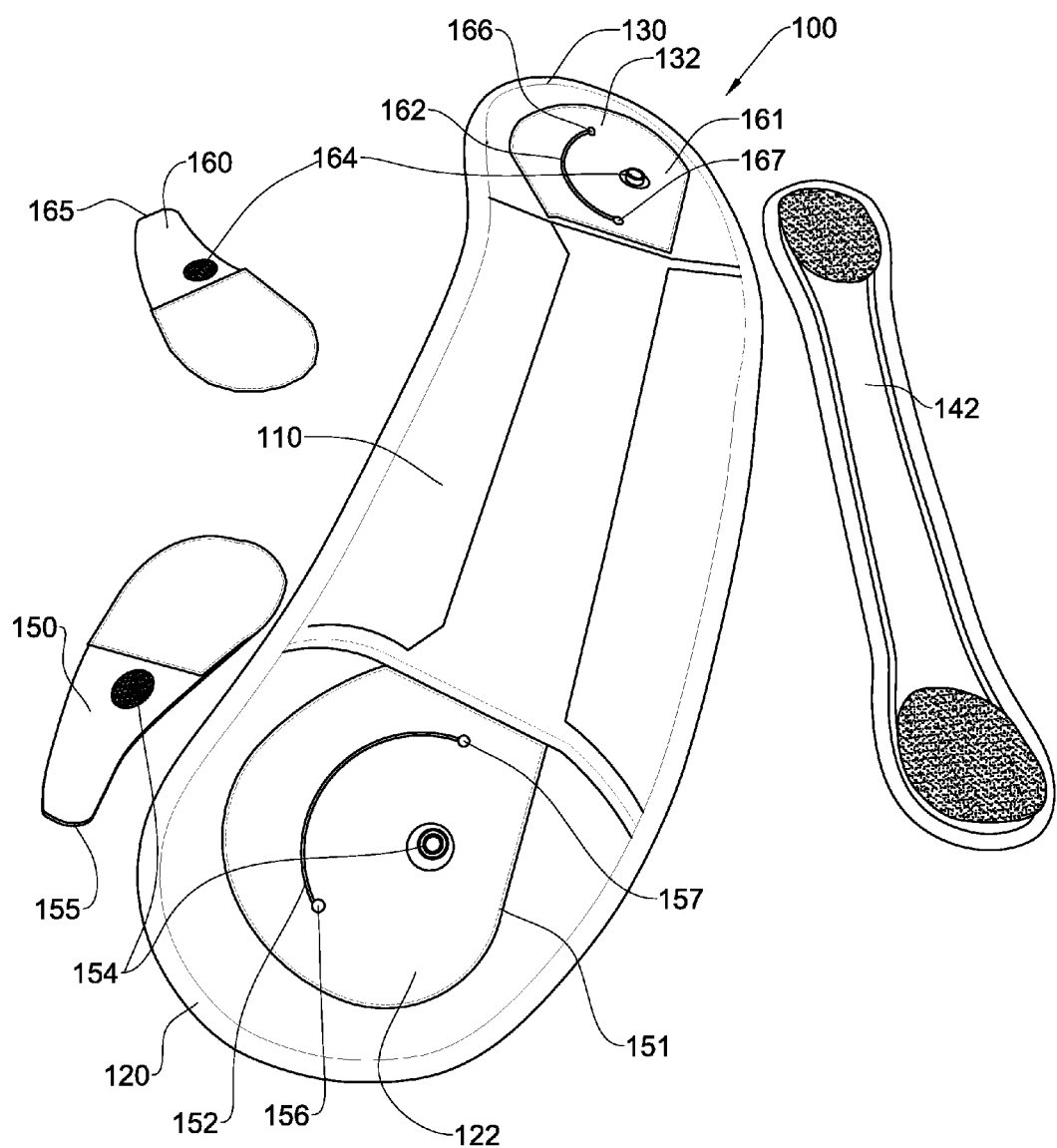
FIG. 8 is the head restraint of FIG. 6A in a disassembled configuration in which the restraining member and the headrest member of the head restraint are disassembled from each other.

As can be seen in FIG. 8, the first side member 150 is configured with a first projecting portion 155 which is received and slidingly displaceable within the first delimiting channel 152 between two extreme ends thereof upon displacement of the restraining member 140 between its upward and downward positions.

As shown in FIGS. 6A and 6C, the second side member 160 is configured with a second projecting portion 165 which is received and slidingly displaceable within the second delimiting channel 162 between a lower end 166 and an upper end 167 upon displacement of the restraining member 140 between the upward and downward positions, respectively. The lower end 166 restricts further upward pivoting of the restraining member 140 beyond its upward position, and the upper end 167 restricts further downward pivoting of the straining member 140 beyond its downward position, thereby, for example, preventing the central member 142 to be located lower than a predetermined level, e.g., in front of the child's eyes.

The central member 142 is formed of a flexible and soft material. This material is rigid though pliable. The headrest member 110 is formed of flexible and soft cushioning material. The first side member 150, the second side member 160, the two channel elements 151 and 161, are all made of a hard and a rigid though pliable plastic material. According to the present example, this material is polymer, and in particular, polypropylene.

It should be indicated that according to other examples, the headrest member 110 is not necessarily flexible, but in any case should allow pivoting of its side portions.

As indicated above, the headrest member 110 is shown in FIGS. 6A to 6F in its first state. At this state, the first side portion 120 and the second side portion 130 are spaced from each other at a first extent represented by a distance D3 (FIGS. 6B and 6D). The distance D3 is taken along an axis that is parallel to the axis of rotation X and passes through a central point 106' of the head 106. The first state of the headrest member 110 is in its normal state to which the side portions of the headrest member 110 tend to revert. The normal state is provided due to the geometry and the structure of the headrest member 110.

The restraining member 140 is structured so that the distance between the first and the second side members 150 and 160 is substantially constant during the pivoting of the restraining member 140 between its upward and downward positions. In light of this characteristic of the restraining member 140, and the fact that the distance between the first and the second side members 150 and 160 is smaller than the distance between the external faces 122 and 132 at the upward configuration of the restraining member 140, displacement of the restraining member 140 from its upward position to its downward position causes the headrest member 110 to assume its second state. This result is provided by the first and the second side members 150 and 160, which bend the first and the second side portions 120 and 130 with respect to the back portion 112, respectively, causing them to approach each other. Likewise, displacement of the restraining member 140 from its downward position to its upward position causes the headrest member 110 to assume its normal first state.

Reference is now made to FIGS. 7A to 7F, in order to explain in a detailed manner the structure and manner of operation of the head restraint 100 with the restraining member 140 in its downward position and the headrest member 110 in its second state.

As shown in FIG. 7B, in the downward position of restraint member 140, its central member 142 is located in front of the forehead 107 of the child's head 106, and spaced therefrom so that a gap m' extends between the central member 142 and the forehead 107. The gap m' provides an extra measure of comfort to the child 105, since when the child 105 is awake, there is no contact between the forehead 107 and the restraining member 140. However, the gap should not be too great in order to allow the restraining member 140 to effectively operate when the contact between the forehead 107 and the central member 142 is established. This contact may be established if the child's head 106 will fall in the forward direction when she falls asleep.

In addition, as shown in FIG. 7B, the first and the second side portions 120 and 130 provide support to the sides 108 and 108' of the child's head (in FIG. 7B). The first and the second side portions 120 and 130 further constitute a side impact protector for the user's head 106.

As indicated above, the headrest member 110 is shown in FIGS. 7A to 7F in its second state. At this state, the first side portion 120 and the second side portion 130 are spaced from each other at a second extent represented by a distance D4 (shown in FIGS. 7B and 7D), which is smaller than the distance D3. The distance D4 is taken along an axis that is parallel to the axis of rotation X and passes through the central point 106' of the head 106. As shown in FIG. 7B, the first and the second side portions 120 and 130 are disposed in proximity to the user's temples, thereby reducing noise that approaches the child's ears and improving the quality of her sleep.

The distance D4 can be regulated by changing the length of the restraining member 140. For example, if the child feels discomfort with the first and the second side portions touching his ears, the length of the restraining member 140 can be increased, thereby increasing the distance D4.

The invention claimed is:

1. A head restraint, comprising:
   a headrest member configured with a back portion and two side portions extending therefrom, the side portions are foldable with respect to the back portion so as to allow the headrest member to assume a first state in which the side portions are spaced from each other at a first extent and a second state in which the side portions are spaced from each other to a second extent which is smaller than said first extent;
   a mounting arrangement articulated to the headrest member for mounting the head restraint to a seat; and
   a restraining member pivotally articulated to said side portions and configured for rotation at least between an upward position and a downward position, wherein displacement of the restraining member between its upward position and its downward position is configured to cause the headrest member to assume its first and second states, respectively.

2. A head restraint according to claim 1, wherein the restraining member is configured with two side members and a central member disposed therebetween; and wherein one of said side members is pivotally articulated to an exterior face of one of said side portions, and another one of the side members is pivotally articulated to an exterior face of another one of the side portions.

3. A head restraint according to claim 2, wherein each of the side portions is configured with a delimiting channel formed at its exterior face, and each of the side members is configured with a projecting portion configured to be received within its respective delimiting channel and displaced between two extreme ends thereof upon displacement of the restraining member between the upward and downward positions.

4. A head restraint according to claim 1, wherein the head restraint is modular and has two configurations: a frontal configuration in which the restraining member is pivotally mounted to the headrest member to be displaced between its upward and downward positions; and a rear configuration in which the restraining member is disposed at the rear side of the headrest member and connected thereto; at the rear configuration, the restraining member substantially entirely engages an exterior face of the headrest member and the head restraint is configured to be packed by being rolled or folded.

5. A head restraint according to claim 1, wherein the restraining member has a varying length so as to: adjust the distance between a user's forehead and the restraining member, adjust the distance between the upper portion of a user's head and the restraining member, and adjust the head restraint to different sized heads.

6. A head restraint according to claim 1, wherein the mounting arrangement is configured for attaching the head restraint to a seat headrest of a seat.

7. A head restraint comprising:
 a headrest member configured with a back portion and two side portions extending therefrom; and
 a restraining member pivotally articulated to said side portions and configured for rotation at least between an upward position and a downward position;
 wherein the side portions of the headrest member are foldable with respect to the back portion so as to allow the headrest member to assume a first state in which the side portions are spaced from each other at a first extent and a second state in which the side portions are spaced from each other to a second extent which is smaller than said first extent,
 wherein displacement of the restraining member between its upward position and its downward position is configured to cause the headrest member to assume its first and second states, respectively.

8. A head restraint according to claim 7, further comprising a mounting arrangement articulated to the headrest member for mounting the head restraint to a seat.

9. A head restraint according to claim 7, wherein the restraining member is configured with two side members and a central member disposed therebetween; and wherein one of said side members is pivotally articulated to an exterior face of one of said side portions, and another one of the side members is pivotally articulated to an exterior face of another one of the side portions.

10. A head restraint according to claim 9, wherein each of the side portions is configured with a delimiting channel formed at its exterior face, and each of the side members is configured with a projecting portion configured to be received within its respective delimiting channel and displaced between two extreme ends thereof upon displacement of the restraining member between the upward and downward positions.

11. A head restraint according to claim 7, wherein the head restraint is modular and has two configurations: a frontal configuration in which the restraining member is pivotally mounted to the headrest member to be displaced between its upward and downward positions; and a rear configuration in which the restraining member is disposed at the rear side of the headrest member and connected thereto; at the rear configuration, the restraining member substantially entirely engages an exterior face of the headrest member and the head restraint is configured to be packed by being rolled or folded.

12. A head restraint according to claim 7, wherein the restraining member has a varying length so as to: adjust the distance between a user's forehead and the restraining member, adjust the distance between the upper portion of a user's head and the restraining member, and adjust the head restraint to different sized heads.

13. A seat comprising:
 (a) a seating portion;
 (b) a seat headrest; and
 (c) a head restraint comprising a headrest member configured with a back portion attached to the seat headrest and two side portions extending therefrom; and a restraining member pivotally articulated to said side portions and configured for rotation at least between an upward position and a downward position;
 wherein the side portions of the headrest member are foldable with respect to the back portion so as to allow the headrest member to assume a first state in which the side portions are spaced from each other at a first extent and a second state in which the side portions are spaced from each other to a second extent which is smaller than said first extent,
 wherein displacement of the restraining member between its upward position and its downward position is configured to cause the headrest member to assume its first and second states, respectively.

14. A seat according to claim 13, wherein in the downward position, the restraining member is spaced from a forehead of a user so that a gap extends between the forehead and the restraining member.

15. A seat according to claim 13, wherein the restraining member is configured with two side members and a central member disposed therebetween; and wherein one of said side members is pivotally articulated to an exterior face of one of said side portions, and another one of the side members is pivotally articulated to an exterior face of another one of the side portions.

16. A head restraint according to claim 15, wherein each of the side portions is configured with a delimiting channel formed at its exterior face, and each of the side members is configured with a projecting portion configured to be received within its respective delimiting channel and displaced between two extreme ends thereof upon displacement of the restraining member between the upward and downward positions.

\* \* \* \* \*

UNITED STATES PATENT AND TRADEMARK OFFICE
CERTIFICATE OF CORRECTION

PATENT NO.        : 9,566,885 B2
APPLICATION NO.   : 14/847976
DATED             : February 14, 2017
INVENTOR(S)       : Ben Cohen Gazit It is certified that error appears in the above-identified patent and that said Letters Patent is hereby corrected as shown below:

(73) Assignee:
Remove "Ben Cohen Gazit, Tel Aviv (IL)"
Insert -- ALLDEAL LTD. Tel Aviv (IL) --

Signed and Sealed this
Fifteenth Day of May, 2018

Andrei Iancu
*Director of the United States Patent and Trademark Office*